United States Patent
Yamazaki et al.

(10) Patent No.: US 10,487,001 B2
(45) Date of Patent: Nov. 26, 2019

(54) SEAL STRUCTURE OF OPTICAL FIBER DRAWING FURNACE, AND METHOD FOR DRAWING OPTICAL FIBER

(71) Applicant: SUMITOMO ELECTRIC INDUSTRIES, LTD., Osaka-shi, Osaka (JP)

(72) Inventors: Takashi Yamazaki, Yokohama (JP); Iwao Okazaki, Yokohama (JP); Tatsuya Konishi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 733 days.

(21) Appl. No.: 14/762,080

(22) PCT Filed: Jan. 24, 2014

(86) PCT No.: PCT/JP2014/051568
§ 371 (c)(1),
(2) Date: Jul. 20, 2015

(87) PCT Pub. No.: WO2014/115849
PCT Pub. Date: Jul. 31, 2014

(65) Prior Publication Data
US 2015/0321944 A1    Nov. 12, 2015

(30) Foreign Application Priority Data

Jan. 24, 2013  (JP) .................. 2013-010950
Feb. 12, 2013  (JP) .................. 2013-024071

(51) Int. Cl.
C03B 37/029  (2006.01)
C03B 37/027  (2006.01)
G02B 6/00    (2006.01)

(52) U.S. Cl.
CPC .......... *C03B 37/029* (2013.01); *C03B 37/027* (2013.01); *G02B 6/00* (2013.01); *C03B 2205/80* (2013.01)

(58) Field of Classification Search
CPC . C03B 37/029; C03B 37/027; C03B 2205/80; C03B 2205/81; G06B 6/00
(Continued)

(56) References Cited

U.S. PATENT DOCUMENTS 1,732,431 A  *  10/1929  Bruggmann  ............. H05B 7/12
                                                      313/146
2,507,360 A  *  5/1950  Wicks  ...................... F23M 7/00
                                                      110/173 R
(Continued)

FOREIGN PATENT DOCUMENTS

CN    102838275 A    12/2012
JP    2012-106915 A   6/2012
(Continued)

OTHER PUBLICATIONS

Japanese Office Action dated Aug. 2, 2016 from corresponding Japanese patent application No. 2013-024071, with attached English-language translation.
(Continued)

*Primary Examiner* — Nathan Cumar
(74) *Attorney, Agent, or Firm* — Drinker Biddle & Reath LLP

(57) ABSTRACT

A seal structure of an optical fiber drawing furnace for sealing a gap between an upper end opening of the optical fiber drawing furnace and an optical fiber glass preform inserted from the upper end opening, includes a plurality of blade members, a support mechanism for supporting the plurality of blade members, and a pressing operation mechanism for individually pressing the plurality of blade mem-
(Continued)

bers in a radial direction of the optical fiber glass preform so as to bring distal ends of the plurality of blade members into contact with a side surface of the optical fiber glass preform, wherein a pressing force at the time of bringing the plurality of blade members into contact with the optical fiber glass preform is set at 0.1 to 10 N per blade member.

18 Claims, 14 Drawing Sheets

(58) Field of Classification Search
    USPC .......................................................... 277/312
    See application file for complete search history.

(56) References Cited

U.S. PATENT DOCUMENTS

| | | | |
|---|---|---|---|
| 2002/0092328 A1* | 7/2002 | Pedrido | C03B 37/029 65/540 |
| 2004/0089025 A1 | 5/2004 | Kuwahara et al. | |
| 2006/0280578 A1* | 12/2006 | Shiono | C03B 37/029 411/542 |
| 2010/0207333 A1* | 8/2010 | Otosaka | C03B 37/029 277/634 |
| 2011/0265522 A1* | 11/2011 | Okada | C03B 37/029 65/424 |

FOREIGN PATENT DOCUMENTS

| | | |
|---|---|---|
| WO | WO-2012/033158 A1 | 3/2012 |
| WO | WO-2012/053394 A1 | 4/2012 |

OTHER PUBLICATIONS

Japanese Office Action dated Jun. 21, 2016 from corresponding Japanese patent application, with attached English-language translation.

Specification and Claims of Corresponding Indian Patent Application No. 4407/CHENP/2015.

Specification and Claims of Indian Patent Application No. 2094/CHE/2013.

Representation/Pre-grant Opposition under Section 25(1) of the Patents Act, 2005 filed in corresponding Indian Patent Application No. 4407/CHENP/2015 on Jul. 10, 2019.

* cited by examiner

SEAL STRUCTURE OF OPTICAL FIBER DRAWING FURNACE, AND METHOD FOR DRAWING OPTICAL FIBER

TECHNICAL FIELD

The present invention relates to a seal structure of an optical fiber drawing furnace for closing a gap between an optical fiber glass preform and an upper end opening of the optical fiber drawing furnace, and a method for drawing an optical fiber.

BACKGROUND ART

An optical fiber is manufactured by downwardly moving a quartz-based optical fiber glass preform (hereinafter called a glass preform) from an upper end opening of an optical fiber drawing furnace (hereinafter called a drawing furnace) to the inside of a furnace core tube and also heating and melting the distal end of the glass preform and decreasing the diameter of the distal end of this glass preform and being drawn from a lower end opening. Since the temperature of the inside of the drawing furnace at this time becomes very high (about 2000° C.), carbon with good heat resistance is used in a component of the inside of the drawing furnace.

This carbon has properties oxidized and consumed in a high-temperature oxygen-containing atmosphere. Because of this, it is necessary to hold the inside of the drawing furnace in an atmosphere of nitrogen gas, rare gas such as argon gas or helium gas (hereinafter called an inert gas etc.).

In this case, the outside air (oxygen) is prevented from entering the inside of the drawing furnace by setting the inside of the drawing furnace at positive pressure, but when airtightness is not obtained well in a gap between the glass preform and the upper end opening of the drawing furnace (the gap is not sealed), the outside air is sucked inside the drawing furnace to affect the life of the drawing furnace and also, the amount of use of the inert gas etc. is increased and a manufacturing cost of the optical fiber cannot be decreased. Hence, a seal mechanism for closing the gap between the glass preform and the upper end opening of the drawing furnace is required.

For example, Patent Reference 1 discloses a seal structure including two-step vertical blade members brought into contact with a side surface of a glass preform in an upper end opening of a drawing furnace.

PRIOR ART REFERENCE

Patent Reference

Patent Reference 1: JP-A-2012-106915

SUMMARY OF THE INVENTION

Problems that the Invention is to Solve

However, since the blade members of Patent Reference 1 are configured to always press the side surface of the glass preform, a strong pressing force has problems of damaging a surface of the glass preform or increasing a load on the blade member to tend to break or damage the blade member. On the other hand, for a weak pressing force, there are cases where the blade member cannot be moved smoothly to be brought into contact with the glass preform fully and airtightness cannot be obtained well. Also, for an improper width of the blade member or the improper number of blade members, there are cases where a gap with the glass preform is too large and airtightness cannot be obtained.

Also, Patent Reference 1 described above implements sealing by bringing the plural blade members into contact with the glass preform, but a preform contact surface of each blade member has a cross-sectional shape of substantially a rectangle having a curved surface near to the radius of the preform and has a predetermined thickness in a height direction and is formed in parallel with the side surface of the glass preform, with the result that when the outside diameter of the glass preform varies greatly and the preform contact surface of each blade member is not parallel to the side surface of the glass preform, there is fear that a gap is formed between the preform contact surface of each blade member and the side surface of the glass preform and this gap is communicated between the vertical blade members and the outside air is sucked inside the drawing furnace.

More concretely, when the preform diameter of a glass preform 5 increases toward the upper portion as shown in FIG. 18A, a blade member 104 of an upper step is moved to the side farther from the drawing furnace central axis Z in a radial direction of the glass preform 5 than a blade member 105 of a lower step, and an upper end portion of a preform contact surface 104a of the blade member 104 of the upper step makes contact with the side surface of the glass preform 5 and a lower end portion of the preform contact surface 104a is separated from the side surface of the glass preform 5. As a result, in the blade member 104 of the upper step, a gap is formed between the lower end portion of the preform contact surface 104a and the side surface of the glass preform 5 and further, a gap is also formed between the mutual blade members 104 of the upper step adjacent in a circumferential direction of the glass preform 5 with the above movement, with the result that the inside of the drawing furnace is communicated to the outside through a gap formed between the mutual blade members 105 of the lower step adjacent in the circumferential direction similarly, and the outside air may be sucked inside the drawing furnace.

On the other hand, when the preform diameter of the glass preform 5 decreases toward the upper portion as shown in FIG. 18B, the blade member 105 of the lower step is moved to the side farther from the drawing furnace central axis Z in the radial direction of the glass preform 5 than the blade member 104 of the upper step, and a lower end portion of a preform contact surface 105a of the blade member 105 of the lower step makes contact with the side surface of the glass preform 5 and an upper end portion of the preform contact surface 105a is separated from the side surface of the glass preform 5. As a result, in the blade member 105 of the lower step, a gap is formed between the upper end portion of the preform contact surface 105a and the side surface of the glass preform 5 and further, a gap is also formed between the mutual adjacent blade members 105 of the lower step, with the result that the inside of the drawing furnace is communicated to the outside through a gap formed between the mutual adjacent blade members 104 of the upper step. Thus, also in this case, the outside air may be sucked inside the drawing furnace like the case where the preform diameter increases.

When the outside air is sucked inside the drawing furnace as described above, a carbon component of the inside of the furnace may be oxidized and degraded, or generation of convection inside the drawing furnace may cause variations in pressure to thereby increase variations in diameter of a drawn optical fiber.

The invention has been implemented in view of the actual circumstances as described above, and an object of the invention is to provide a seal structure of an optical fiber drawing furnace capable of avoiding suction of the outside air inside the drawing furnace and also decreasing the amount of use of inert gas etc. and decreasing variations in diameter of a drawn optical fiber, and a method for drawing the optical fiber.

Means for Solving the Problems

A seal structure of an optical fiber drawing furnace according to the present invention is a seal structure of an optical fiber drawing furnace for sealing a gap between an upper end opening of the optical fiber drawing furnace and an optical fiber glass preform inserted from the upper end opening, comprising:
a plurality of blade members, a support mechanism for supporting the plurality of blade members, and a pressing operation mechanism for individually pressing the plurality of blade members in a radial direction of the optical fiber glass preform so as to bring distal ends of the plurality of blade members into contact with a side surface of the optical fiber glass preform,
wherein a pressing force at the time of bringing the plurality of blade members into contact with the optical fiber glass preform is set at 0.1 to 10 N per blade member.

A seal structure of an optical fiber drawing furnace according to the present invention is a seal structure of an optical fiber drawing furnace for sealing a gap between an upper end opening of the optical fiber drawing furnace and an optical fiber glass preform inserted from the upper end opening, comprising:
a plurality of blade members arranged in at least two steps alternately in a vertical direction, a support mechanism for supporting the plurality of blade members, and a pressing operation mechanism for individually pressing the plurality of blade members in a radial direction of the optical fiber glass preform so as to bring distal ends of the plurality of blade members into contact with a side surface of the optical fiber glass preform,
wherein when the total number of blade members is N and a width of the blade member is L and a maximum diameter of the optical fiber glass preform is Dmax and a minimum diameter of the optical fiber glass preform is Dmin, $2\pi \times Dmin > L \times N > \pi \times Dmax$ is satisfied.

Further, a method for drawing an optical fiber according to the present invention is a method for drawing an optical fiber using the seal structure of an optical fiber drawing furnace.

Advantage of the Invention

According to the seal structure of the optical fiber drawing furnace and the method for drawing the optical fiber of the invention, suction of the outside air inside the drawing furnace can be avoided and also, the amount of use of inert gas etc. can be decreased, and variations in diameter of the drawn optical fiber can be decreased. Also, a load on the blade member can be reduced, and the long-life seal structure can be provided.

MODE FOR CARRYING OUT THE INVENTION

Figure 1:
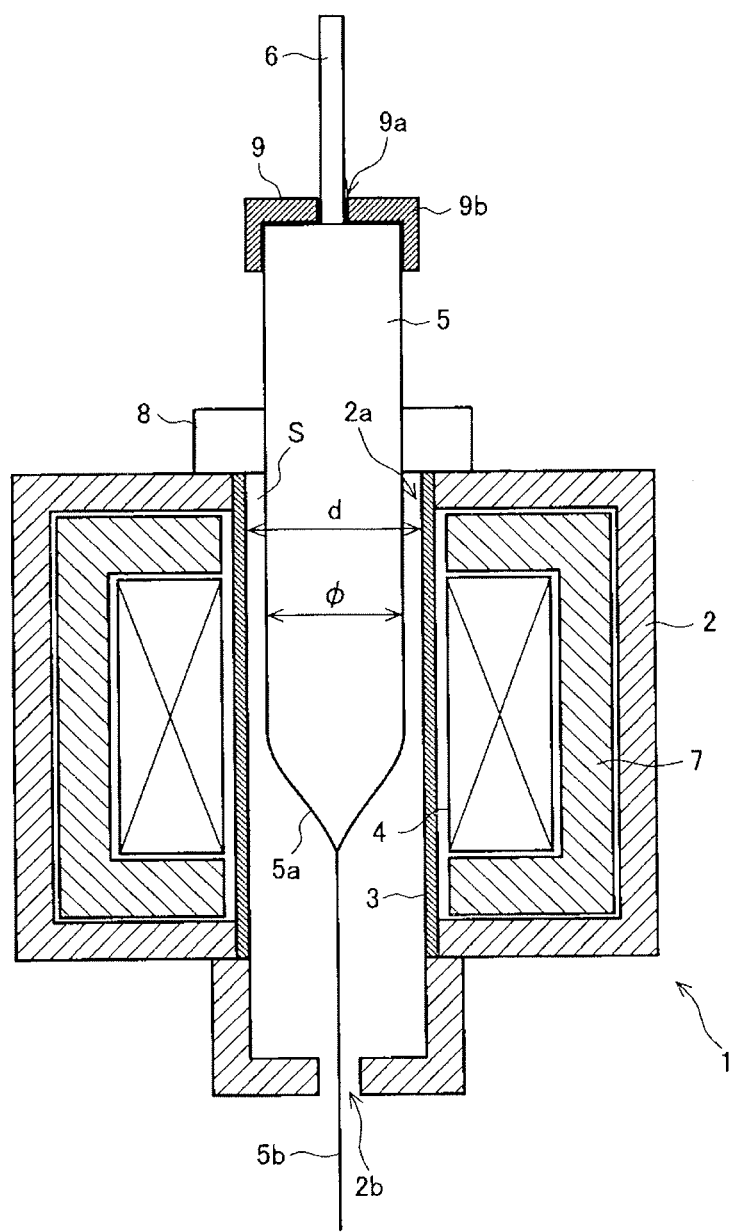
FIG. 1 is a diagram describing an outline of an optical fiber drawing furnace of the invention.

An outline of a drawing furnace to which the invention is applied will be described using FIG. 1. In addition, a resistance furnace for heating a furnace core tube by a heater will be described below by way of example, but the invention can also be applied to an induction furnace for applying a high-frequency power source to a coil and inductively heating a furnace core tube. A drawing furnace 1 includes a furnace housing 2, a furnace core tube 3, a heating source (heater) 4, and a seal mechanism 8. The furnace housing 2 has an upper end opening 2a and a lower end opening 2b, and is formed of, for example, stainless steel. The furnace core tube 3 is formed in a cylindrical shape in the center of the furnace housing 2, and is communicated to the upper end opening 2a. The furnace core tube 3 is made of carbon, and a glass preform 5 is sealed with the seal mechanism 8 from the upper end opening 2a and is inserted into this furnace core tube 3.

Inside the furnace housing 2, the heater 4 is arranged so as to surround the furnace core tube 3 and a heat insulating material 7 is stored so as to cover the outside of the heater 4. The heater 4 heats and melts the glass preform 5 inserted into the furnace core tube 3 so that a melted optical fiber 5b droops with the diameter decreased from a lower end 5a of the glass preform 5. The glass preform 5 can be moved in a drawing direction (downward direction) by a movement mechanism formed separately, and a support rod 6 for hanging and supporting the glass preform 5 is joined to the upper side of the glass preform 5. Also, the drawing furnace 1 is provided with a supply mechanism of an inert gas etc. (not shown), and the inert gas etc. are supplied to the inside of the furnace core tube 3 or the periphery of the heater 4 in order to prevent oxidation degradation.

In addition, FIG. 1 gives an example in which the upper end itself of an inner wall of the furnace core tube 3 forms the upper end opening 2a, but the example is not limited to this. For example, the upper side of the furnace core tube 3 may be provided with an upper lid forming an upper end opening narrower than an inside diameter d of the furnace core tube 3 and in this case, a gap targeted for sealing is a gap formed between this narrow upper end opening and the glass preform 5. Also, a cross-sectional shape of the glass preform 5 shall be a perfect circle basically, but its accuracy does not matter, and the cross-sectional shape may be partially a non-circular shape, an elliptic shape, etc. Also, a cross section of the upper end opening 2a can be formed in a circular shape, but this accuracy does not matter.

The invention is intended for the seal mechanism 8 for closing a gap S between the upper end opening 2a of the drawing furnace 1 and an outer periphery of the glass preform 5 inserted from the upper end opening 2a, and is particularly characterized in that the glass preform 5 of the inside of the furnace is heated by the heater 4 while preventing the outside air of the outside of the furnace from being sucked by the seal mechanism 8 formed on the upper end opening 2a.

A lid body 9 formed on the upper portion of the glass preform 5 is means for handling a seal in the vicinity of the completion of a drawing process. As shown in FIG. 1, a configuration of providing the glass preform 5 with the support rod 6 has a state in which the support rod 6 is lowered to a position of the furnace core tube 3, that is, a state in which the support rod 6 is in a position lower than the upper end of the drawing furnace 1, depending on progress of the drawing process. In order to continue to seal the inside of the drawing furnace even in such a state, it is desirable to include the lid body 9 in addition to the seal mechanism 8.

The lid body 9 is a lid placed on the upper side of the glass preform 5 and the support rod 6 extends through the lid, and the lid body 9 has a through hole 9a for the support rod 6, and a shoulder part 9b as shown in the drawing. A material of the lid body 9 includes, for example, quartz or metal.

By forming the lid body 9, even when drawing of the optical fiber 5b makes progress to downwardly move the glass preform 5 and the support rod 6, a seal state can be maintained by changing to a state in which a lower end surface of the lid body 9 makes contact with the seal mechanism 8 before the glass preform 5 is separated from the seal mechanism 8.

In addition, the lid body 9 is described on the premise that the lid body 9 has the shoulder part 9b, but the lid body 9 may have a shape in which the through hole 9a of the support rod 6 is only opened in a simple disk. Even for such a shape, the change between the states as described above can be made similarly.

First Embodiment

Figure 2:
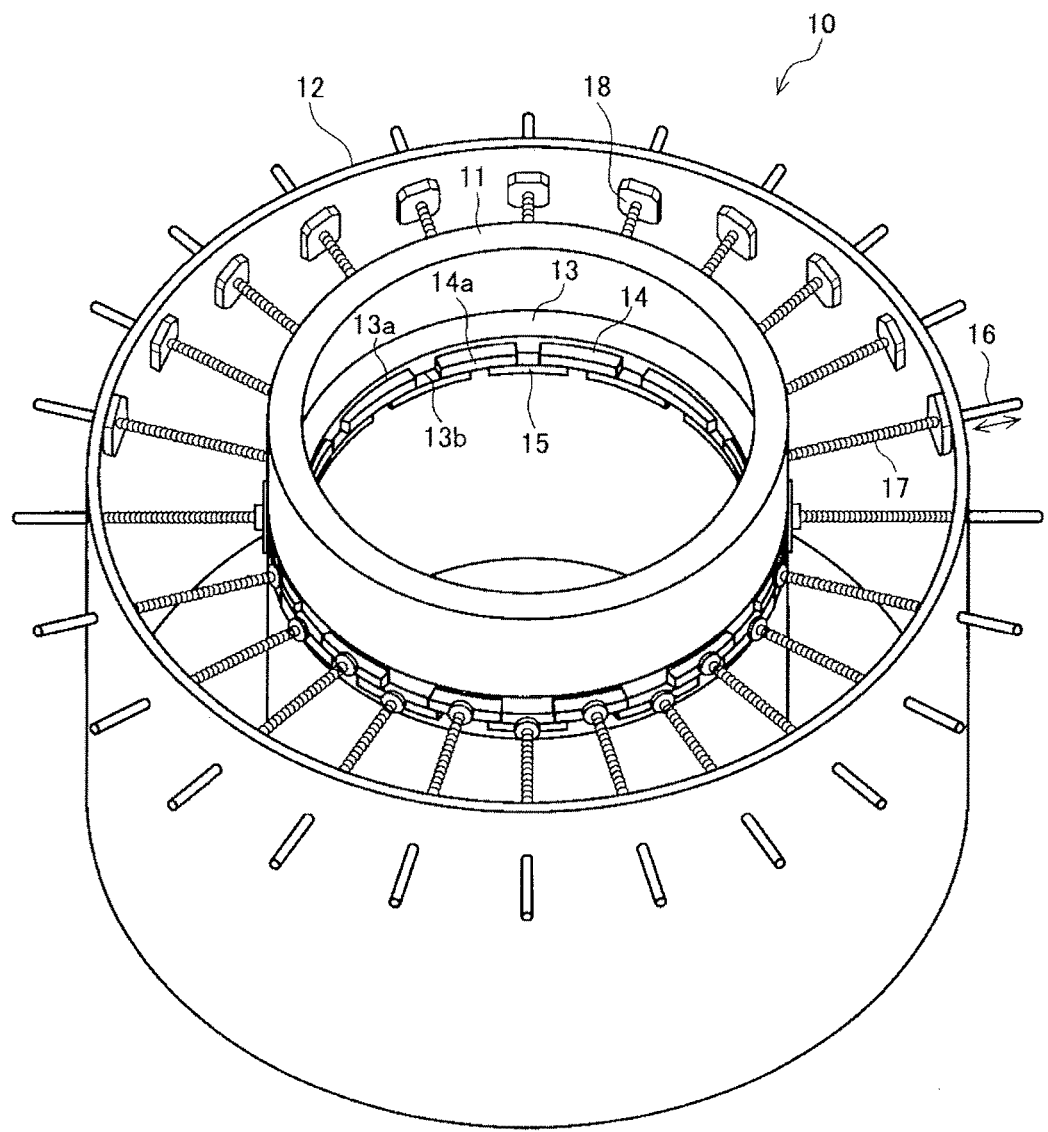
FIG. 2 is a perspective view showing an outline of a first embodiment of a seal structure according to the invention.

A seal structure according to a first embodiment of a seal mechanism will hereinafter be described with reference to FIG. 2. FIG. 2 is a perspective view showing an outline of a seal structure 10.

The seal structure 10 includes plural blade members 14, 15 with heat resistance, a cylinder 11 forming a part of a support mechanism for supporting the blade members 14, 15, and a mechanism (hereinafter called a pressing operation mechanism) having operation of inwardly pressing the blade members 14, 15. Hereinafter, the cylinder 11 is called an inside cylinder in order to distinguish the cylinder 11 from an outside cylinder 12 described below. In addition, the outside cylinder 12 forms a part of the support mechanism for supporting the blade members 14, 15.

Figure 4A:
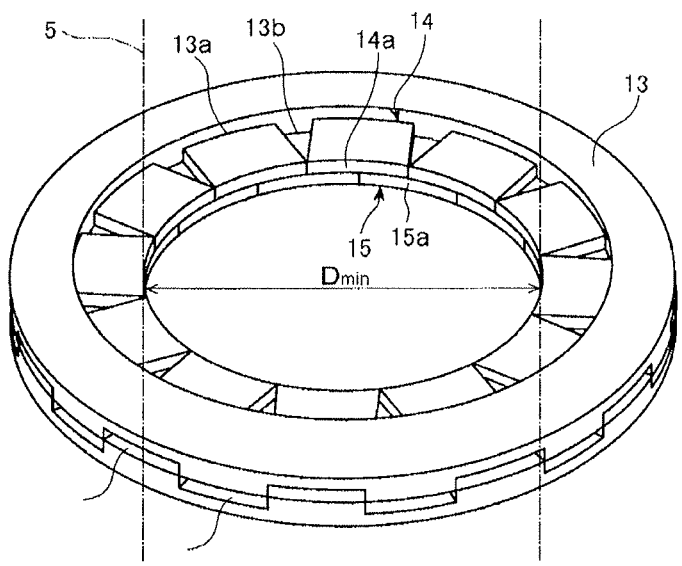
FIG. 4A and FIG. 4B are diagrams describing an action and one example of blade members in the seal structure of FIG. 2 or FIG. 3.
Figure 4B:
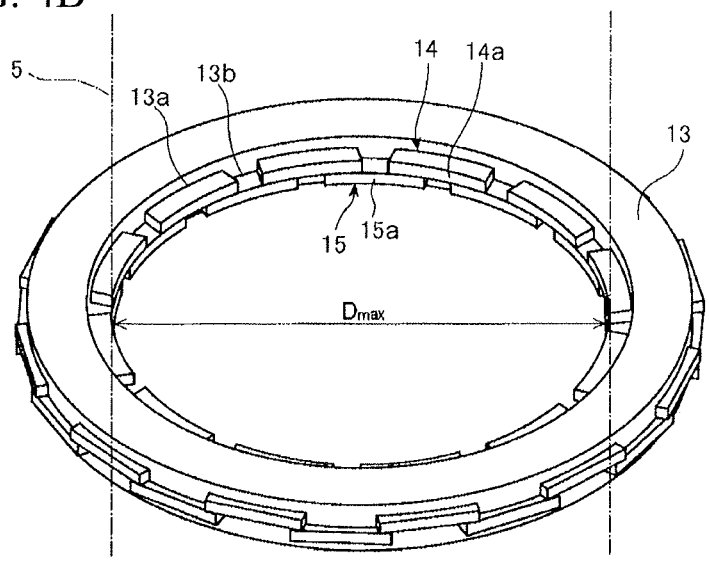

The inside cylinder 11 includes plural guide holes 13a, 13b for sliding the plural blade members 14, 15 on the circumference of the inside cylinder 11, for example, in two steps alternately. The guide holes 13a, 13b are formed radially with respect to the central axis of the inside cylinder 11, and the blade members 14, 15 are also installed movably in a radial and linear direction. The guide holes 13a, 13b are not directly formed in the inside cylinder 11 and, for example, as shown in FIG. 4A and FIG. 4B, a disk-shaped storage part 13 for storing the blade members 14, 15 can be formed in the inside cylinder to form each of the guide holes 13a, 13b in its storage part 13.

Each of the blade members 14, 15 has, for example, substantially a rectangular parallelepiped shape in which the cross-sectional shape in a plane perpendicular to a movement direction is substantially a rectangle. In addition, the thickness of each of the blade members 14, 15 may be thin and be, for example, about 1 mm. In addition, each of the guide holes 13a, 13b is a hole with a shape adapted for the cross-sectional shape of each of the blade members 14, 15.

The distal end of each of the blade members 14, 15 is brought into contact with a side surface of a glass preform at the time of being pressed by the pressing operation mechanism as described below. Consequently, the distal end of each of the blade members 14, 15 is preferably formed in a circular arc shape having curvature adapted for a maximum value (a maximum diameter of the glass preform used) assumed as a radius of the glass preform in order to minimize a gap with the glass preform at the time of contact. FIG. 2 etc. show an example of adopting such a circular arc.

Also, a material of each of the blade members 14, 15 is preferably carbon. Since the carbon has good heat resistance and also is a soft material capable of being processed with a low coefficient of friction, there is no fear of damaging the glass preform. Particularly, soft carbon with a Shore hardness of 100 or less is preferably adopted as the blade members 14, 15 of the present example. Also, it is preferable that the carbon can easily be molded by press molding, cutting, etc.

As the material of each of the blade members 14, 15, for example, glass (quartz) or SiC coated carbon in addition to the carbon can be adopted. Also, even in the case of using other hard materials, the glass preform is not damaged, for example, by using soft carbon in only the distal end portion.

It is necessary that each of the blade members 14, 15 should be a material which is not melted by heat of a drawing furnace, and each of the blade members 14, 15 preferably has resistance to heat of about 200° C. or more. In addition, when each of the blade members 14, 15 has insufficient heat resistance, a mechanism (for example, a water cooling method) for cooling the blade members 14, 15 may be provided.

Also, when the carbon is used as each of the blade members 14, 15, in order to prevent oxidation degradation, it is desirable to hold the periphery of the blade members 14, 15 in an atmosphere of an inert gas etc. by, for example, spraying the blade members 14, 15 with the inert gas etc.

An inside diameter of the inside cylinder 11 or a length of each of the blade members 14, 15 in the movement direction can be determined so as to fill a gap formed between the drawing furnace and the glass preform. In an example of FIG. 1, a width of a gap S formed between a glass preform 5 and a furnace core tube 3 in an upper end opening 2a becomes a value obtained by halving a value obtained by subtracting a diameter φ of the glass preform 5 from a diameter d of the furnace core tube 3.

However, since an outside diameter of the glass preform 5 varies actually, the inside diameter of the inside cylinder 11 or the lengths of the blade members 14, 15 in the movement direction can be determined based on a distance (preferably, a maximum distance assumed) assumed as the gap S. For example, in the case of forming the glass preform 5 with the diameter φ of 90 mm and diameter variations of ±10 mm, the diameter d of the furnace core tube 3 has only to be about 120 mm, with the result that the width of the gap S becomes about 10 to 20 mm.

Also, it is necessary to properly select the number of blade members 14, 15 or a width (a length parallel to a tangential direction of the inside cylinder 11) of each of the blade members 14, 15 according to a bend amount, an outside diameter variation amount in a longitudinal direction or an outside diameter of the glass preform used. Basically, as the number of blade members 14, 15 increases, airtightness can be obtained more easily.

And, the pressing operation mechanism described above individually presses the plural blade members 14, 15 in a radial direction (more accurately, a radial direction of the inside cylinder 11 or the storage part 13) of the drawing furnace so as to bring the distal ends of the plural blade members 14, 15 into contact with a side surface of the glass preform with the plural blade members 14, 15 respectively inserted into the plural guide holes 13a, 13b. This pressing force shall be weak to the extent to which a surface of the glass preform is not damaged or the blade member is not broken or damaged, and shall be strong to the extent to which the blade member can be moved smoothly.

Incidentally, in a drawn optical fiber, variations in diameter occur and particularly, when the outside air is sucked inside the drawing furnace, generation of convection inside the drawing furnace causes variations in pressure to increase the variations in diameter. Also, when the outside air is sucked inside the drawing furnace, a carbon component of the inside of the furnace is oxidized and degraded. As a result, the degree of variations in diameter or the degree of degradation of the inside of the furnace varies depending on good or bad airtightness by a seal mechanism 8, and the good or bad airtightness varies by changing the pressing force described above. In addition, variations in diameter of the optical fiber (a value (3σ) three times variations (standard deviation σ) in diameter of the glass fiber) are desirably set at ±0.5 μm or less.

The present inventor et al. measured, for example, the degree of degradation of the inside of the furnace and variations in diameter of the optical fiber 5b manufactured by the drawing furnace 1 while changing the pressing force per blade member. The results were shown in the following (1) to (5).

(1) When the pressing force was less than 0.1 N, variations in diameter of the optical fiber were more than ±0.5 μm.

(2) When the pressing force was 0.1 N, variations in diameter of the optical fiber were ±0.4 μm.

(3) When the pressing force was 1 N, variations in diameter of the optical fiber were ±0.15 μm.

(4) When the pressing force was 10 N, variations in diameter of the optical fiber were ±0.15 μm, but the blade member was sometimes worn.

(5) When the pressing force was more than 10 N, the blade member was broken and the carbon component of the inside of the furnace was oxidized and degraded.

From the above results, the present inventor et al. found that the pressing force per blade member was desirably set in the range of 0.1 to 10 N in order to set the variations in diameter of the optical fiber at ±0.5 μm or less and was more desirably set in the range of 0.1 to 1 N in order to prevent the blade member from being worn.

Also, the width of the blade member and the number of blade members required are determined by a maximum diameter and a minimum diameter of the glass preform. When blades have two steps and the total number of blade members is N and the width of the blade member is L and the glass preform has a minimum diameter Dmin, the distal ends of the blade members must be prevented from making contact with each other in each of the vertical steps, with the result that it is necessary to satisfy $\pi \times Dmin > L \times N/2$. In addition, the distal end of the blade member actually has the circular arc shape, but its length is regarded as being equal to L to do calculation.

Also, when the glass preform has a maximum diameter Dmax, the blade members must have no gap between the adjacent blades of the vertical steps, with the result that it is necessary to satisfy $L \times N > \pi \times Dmax$. Consequently, L and N must satisfy $2\pi \times Dmin > L \times N > \pi \times Dmax$.

Also, a value of variations in diameter of the optical fiber varies by changing the width or the number of blade members 14, 15.

When the number of blade members 14, 15 is less than five per step, the gap between the glass preform and the distal end of the blade member increases, and variations in diameter of the optical fiber are more than ±0.5 μm, but when the number of blade members is five (ten in total) or more per step, variations in diameter of the optical fiber become a good value (±0.5 μm or less). As a result, the number of blade members 14, 15 is preferably five (ten in total) or more per step. In addition, in the case of 50 or more per step, the cost increases and the case is not practical.

Also, when the width L of each of the blade members 14, 15 is less than 5 mm, the blade members 14, 15 are not moved sometimes due to too light weight, and when the width L of each of the blade members 14, 15 is between 5 mm and 50 mm (both inclusive), variations in diameter of the optical fiber become a good value. However, when the width L of each of the blade members 14, 15 is more than 50 mm, like the case of the small number of blade members described above, the gap between the glass preform and the distal end of the blade member increases, and variations in diameter of the optical fiber are more than ±0.5 μm. As a result, the width L of each of the blade members 14, 15 is preferably between 5 mm and 50 mm (both inclusive).

As described above, the inside cylinder 11 is provided with the plural guide holes 13a, 13b on the circumference of the inside cylinder 11 in two steps alternately, and the blade members 14, 15 are inserted into these guide holes in a linearly movable state. Consequently, the plural blade members 14 are equally spaced on the circumference of the inside cylinder 11 and also, the plural blade members 15 are equally spaced on the circumference of the inside cylinder 11. And, a distance is prevented from being vertically formed between the blade members 14 and the blade members 15.

Further, the blade members 14, 15 are constructed so that a gap formed between the adjacent blade members 14 is filled with the blade member 15 and a gap formed between the adjacent blade members 15 is filled with the blade member 14. That is, the blade members 14, 15 are arranged so that the gap between the adjacent blade members 14 does not overlap with the gap between the adjacent blade members 15. Accordingly, the gap S of FIG. 1 can be closed to be sealed so that the inert gas etc. are resistant to leakage.

Thus, in the invention, the plural blade members 14, 15 are preferably formed so as to overlap alternately in a two-layer structure. Such a structure closes the gap formed in the upper end opening of the drawing furnace by bringing the distal ends of the blade members 14, 15 into contact with the glass preform. And, each of the plural blade members 14, 15 is installed slidably independently in a horizontal direction toward the center of the glass preform.

For example, as shown in FIG. 2, the pressing operation mechanism described above can include plural rod-shaped members 16 in which one ends are respectively fixed to the back ends of the plural blade members 14, 15 and the other ends are respectively held in the outside cylinder 12, and plural coil spring members 17 formed along the plural respective rod-shaped members 16. In addition, the outside cylinder 12 is not limited to the cylinder, and may be a polygonal tubular member as long as the outside cylinder 12 can function as an outer wall. In addition, the coil spring member 17 does not have to have a coil shape as long as the coil spring member 17 has an axially extendable structure.

And, this pressing operation mechanism can be moved in a radial direction by respectively inserting the plural rod-shaped members 16 into loose insertion holes of fixing members 18 fixed to the outside cylinder 12. The plural coil spring members 17 are arranged formed along the rod-shaped members 16, and are respectively brought into contact with the plural blade members 14, 15 and the fixing members 18. Accordingly, this pressing operation mechanism can individually press the plural blade members 14, 15 on the side of the glass preform by the pressing forces of the coil spring members 17.

Figure 3:
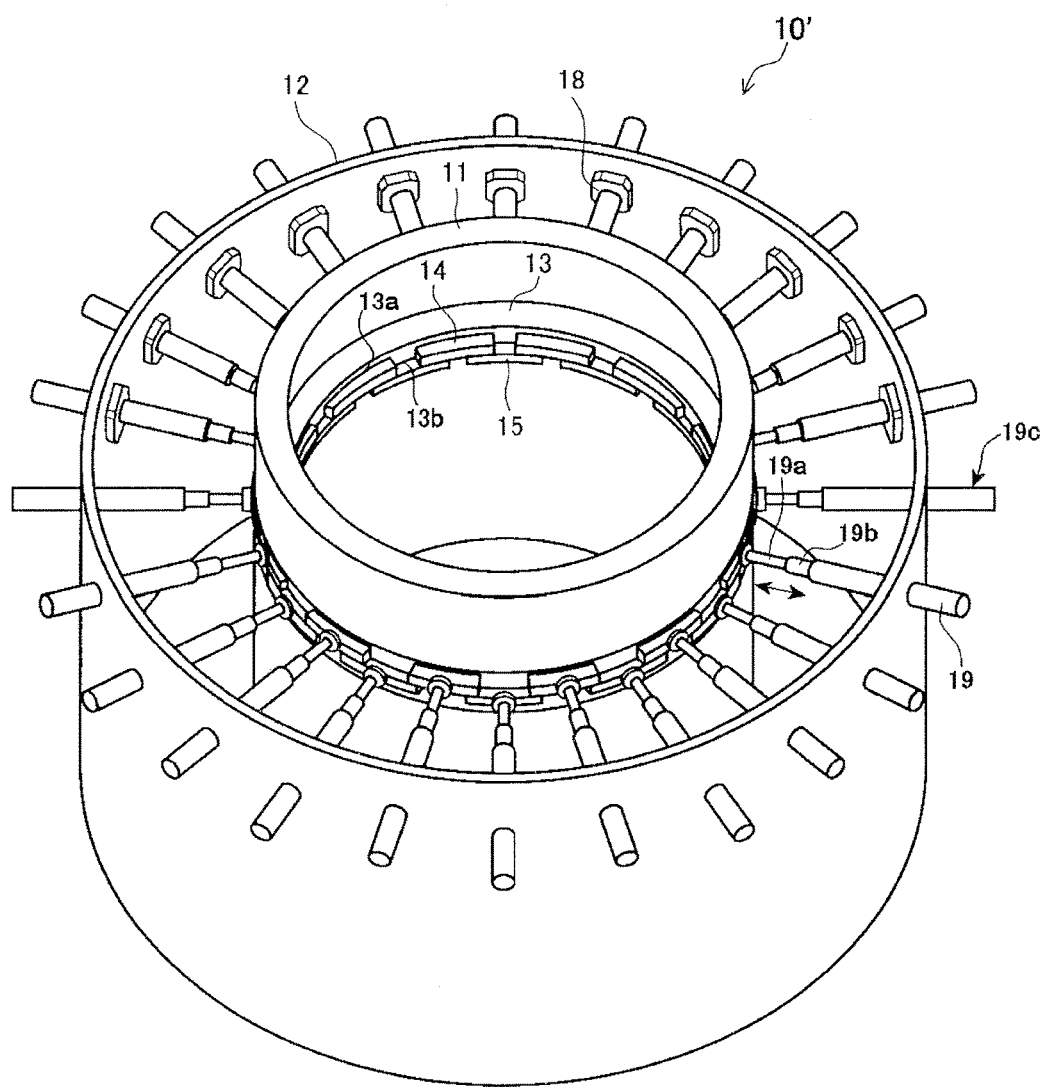
FIG. 3 is a perspective view showing an outline of a modified example of the first embodiment of the seal structure according to the invention.

In addition, the pressing operation mechanism described in FIG. 2 includes the rod-shaped members 16, the coil spring members 17, etc., but may include an air cylinder like a modified example of a pressing operation mechanism illustrated in FIG. 3.

A seal structure 10' including the modified example of the pressing operation mechanism illustrated in FIG. 3 includes blade members 14, 15 and an inside cylinder 11 like FIG. 2. Also, a configuration including the inside cylinder 11 and an outside cylinder 12 as a support mechanism for supporting the blade members 14, 15 is similar to that of FIG. 2.

The pressing mechanism in the seal structure 10' is configured by plural air cylinders. Each of the air cylinders 19 is formed instead of the rod-shaped member 16 and the coil spring member 17 of FIG. 2. Each of the air cylinders 19 is a member whose length is extended and contracted with respect to a radial direction of a drawing furnace body, and includes piston rods 19a, 19b and a cylinder tube 19c, and has a pressing force in an extension direction. The piston rods 19a, 19b have the small-diameter rod 19a in order to fix the plural blade members 14, 15, and the rod 19b with a larger outside diameter fixed to its rod 19a. The large-diameter rod 19b is inserted out of or into the cylinder tube 19c to thereby extend and contract the air cylinder 19.

And, one end (distal end of the small-diameter rod 19a) of each of the air cylinders 19 is respectively fixed to the back end of each of the plural blade members 14, 15, and the other end (end opposite to the rods 19a, 19b in the cylinder tube 19c) of each of the air cylinders 19 is respectively attached by a fixing member 18 so as to extend through the outside cylinder 12. By the pressing forces of these air cylinders 19, the plural blade members 14, 15 can individually be pressed on the side of the glass preform.

FIG. 4A and FIG. 4B are diagrams describing an action and one example of the blade members in the seal structures 10, 10' described above.

In the seal structures 10, 10', the guide holes and the blade members are formed in the two steps, but have only to be formed in at least one step in the seal structure according to the embodiment, and three steps or more can similarly be applied. In the case of one step, in order to fill the gap between the adjacent blade members on a horizontal plane, for example, a configuration in which a surface of contact between the blade member and the glass preform is decreased and the number of blade members is increased so that its surface abuts on the mutual blade members may be adopted. However, in the case of one step, there is fear that the gap is formed between the adjacent blades as described above and the gap with the glass preform also varies depending on roundness of the glass preform in a position of contact with the blade member.

Since this phenomenon can be solved by the blade members of two steps or more, a structure of two steps or more is desirably adopted. A structure in which such a structure of two steps or more is used as one set and this set overlaps in two sets or more may be adopted.

In addition, in the case of the blade members of three steps or more, like the case of two steps, the blade members can be arranged so as to fill the gap between the blade members by preventing the adjacent blade members from forming the gap vertically, but the structure of three steps or more becomes more complicated than that of two steps.

In the seal structures 10, 10' described above, for example, when the glass preform 5 of the minimum diameter (diameter Dmin) assumed is used, each of the blade members 14, 15 has only to be designed to be projected to the extent to which the mutual distal ends of the blade members 14 or the mutual distal ends of the blade members 15 make contact as shown in FIG. 4A. On the other hand, when the glass preform 5 of the maximum diameter (diameter Dmax) assumed is used, each of the blade members 14, 15 has only to be designed to be substantially stored in the storage part 13 and also have no gap between the adjacent blade members 14, 15 as shown in FIG. 4B. And, variations in diameter of the glass preform 5 can be absorbed by horizontally sliding each of the blade members 14, 15 in the range individually illustrated in FIGS. 4A and 4B.

In the seal structures 10, 10' of the embodiment as described above, the gap S formed between the furnace core tube 3 and the glass preform 5 can well be closed even when the variations in diameter of the glass preform 5 of FIG. 1 are great. As a result, the flow of the outside air into the furnace can be reduced.

Also, in the seal structures 10, 10', in a thick place in the glass preform, the blade members 14, 15 are moved radially toward the outside cylinder 12 (outwardly). By a simple structure in which the blade members 14, 15 are moved radially toward the center of the inside cylinder 11 (inwardly) in the thin place, the gap S can be closed and variations in diameter of the glass preform can also be absorbed automatically. Further, by having a structure of independently sliding each of the plural blade members 14, 15, the structure can cope with the case where the diameter of the glass preform is not constant on the same cross section, that is, the glass preform has a non-circular cross section.

Incidentally, the blade members 14, 15 shown in FIGS. 2 to 4 have, for example, the distal ends overlapping vertically in a state shifted by a half pitch. These distal ends are desirably formed in a shape of linear contact with the side surface of the glass preform in its overlapping position.

Figure 5:
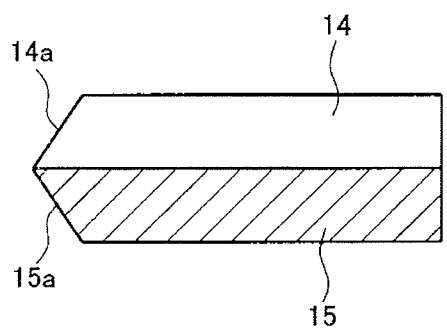
FIG. 5 is one example of a partially sectional view of the blade members of FIG. 2 or FIG. 3.

Specifically, as shown in FIG. 5 cut along the movement direction of the blade member, a distal end 14a of the blade member 14 of an upper step is inclined linearly so that a lower portion of the distal end 14a is nearer to the central axis of the upper end opening 2a of FIG. 1, and the lower surface end of the blade member 14 is projected toward the glass preform than the upper surface end of the blade member 14. On the other hand, a distal end 15a of the blade member 15 of a lower step is inclined linearly so that an upper portion of the distal end 15a is nearer to the central axis of the upper end opening 2a, and the upper surface end of the blade member 15 is projected toward the glass preform than the lower surface end of the blade member 15.

Accordingly, each of the distal ends 14a, 15a can be brought into linear contact with the side surface of the glass preform in a position in which the upper and lower blade members overlap. Even when the gap S of FIG. 1 varies greatly and a gap is formed between the mutual blade members adjacent in the circumferential direction, contact between the lower end of the distal end 14a of the upper step and the side surface of the glass preform, and contact between the upper end of the distal end 15a of the lower step and the side surface of the glass preform are maintained.

More concretely, the blade member 14 of the upper step is provided with clearance to the upper surface end side with the lower surface end left, and the blade member 15 of the lower step is provided with clearance to the lower surface end side with the upper surface end left. As a result, gaps may be formed between the glass preform and the upper end of the distal end 14a of the upper step, and between the glass preform and the lower end of the distal end 15a of the lower step. However, even when the diameter of the preform increases or decreases, gaps are not formed between the glass preform and the lower end of the distal end 14a of the upper step, and between the glass preform and the upper end of the distal end 15a of the lower step and also, the upper and lower blade members have an overlap portion, with the result that the gap is not communicated in the vertical direction, and the gap between the upper end opening and the glass preform can be closed. As a result, gas leakage inside the drawing furnace is prevented and suction of the outside air can be avoided and also, the amount of use of inert gas etc. can be decreased.

In addition, FIG. 5 describes the blade members 14, 15 inclined linearly, but the blade members may be curved.

Figure 6:
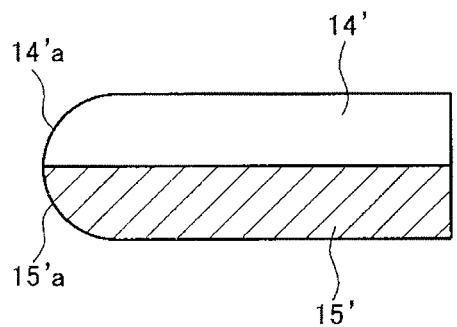
FIG. 6 is another example of a partially sectional view of the blade members.

Specifically, blade members 14', 15' shown in FIG. 6 also have distal ends 14a', 15a' formed in a shape of linear contact with the side surface of the glass preform in a position in which the upper and lower blade members overlap. The distal end 14a' of the blade member 14' of an upper step is inclined in a curved shape so that a lower portion of the distal end 14a' is nearer to the central axis of the upper end opening 2a of FIG. 1. In addition, the curve may be formed in an outwardly convex shape as shown in FIG. 6, or may be formed in an outwardly concave shape. On the other hand, the distal end 15a' of the blade member 15' of a lower step is inclined in a curved shape so that an upper portion of the distal end 15a' is nearer to the central axis of the upper end opening 2a. Particularly, when the distal ends 14a', 15a' are inclined in the curved shape in the convex shape, as compared with the case of being inclined linearly, a load on the distal end is lower and the long-life blade member can be provided.

Second Embodiment

Figure 7:
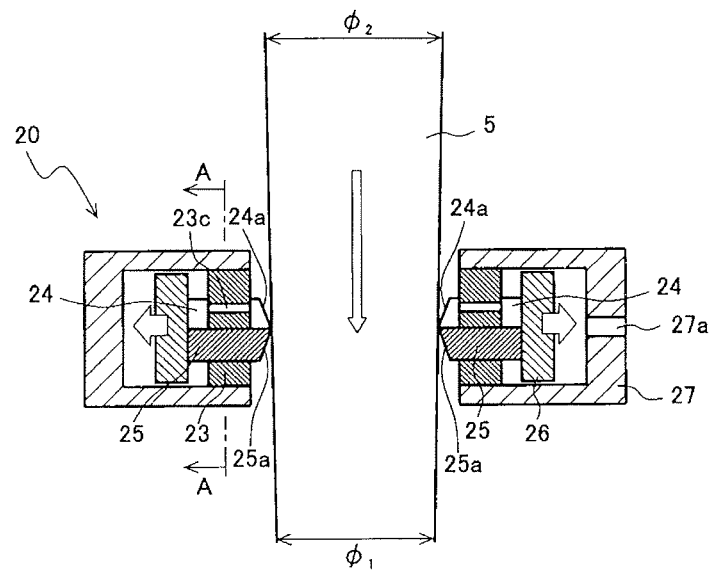
FIG. 7 is a sectional view showing an outline of a second embodiment of a seal structure according to the invention.
Figure 8:
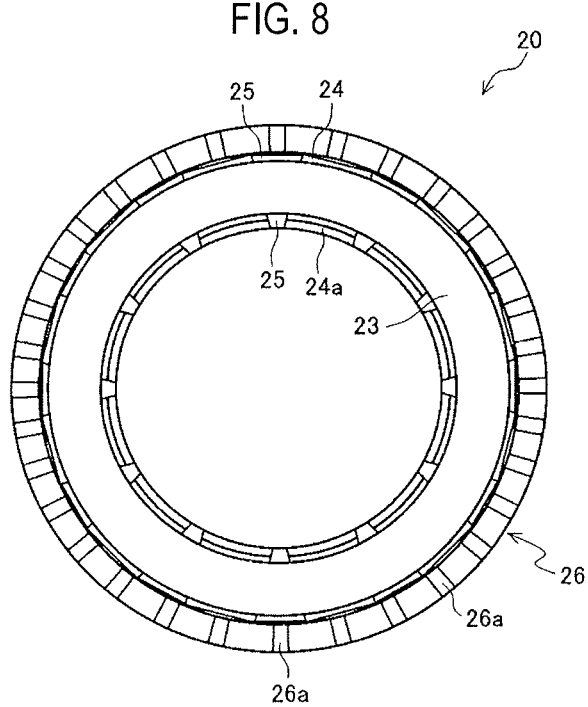
FIG. 8 is a top view showing a main part of the seal structure of FIG. 7.
Figure 9:
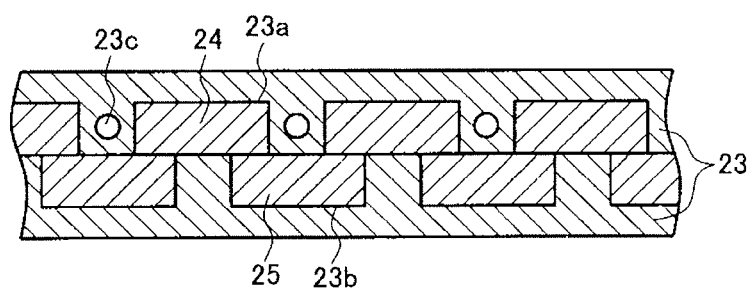
FIG. 9 is a diagram showing a cross section of A-A of the seal structure of FIG. 7.
Figure 10:
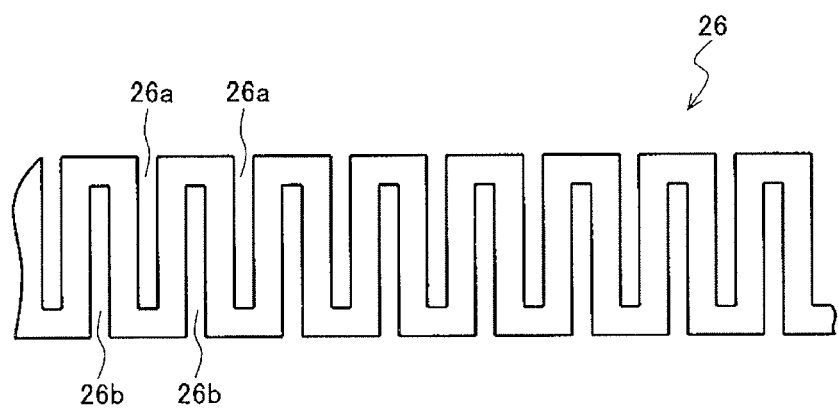
FIG. 10 is a diagram showing one example of a cylindrical slit spring in the seal structure of FIG. 7.

Next, a seal structure according to a second embodiment of a seal mechanism will be described with reference to FIGS. 7 to 10. FIG. 7 is a sectional view showing an outline of a seal structure 20, and FIG. 8 is a top view showing a main part of the seal structure of FIG. 7, and FIG. 9 is a diagram showing one example of a storage part of blade members in the seal structure 20, and FIG. 10 is a diagram showing one example of a cylindrical slit spring used in the seal structure 20.

The seal structure 20 of the second embodiment includes plural blade members 24, 25 with heat resistance, a storage part 23 forming a part of a support mechanism for supporting the blade members 24, 25, and a cylindrical slit spring 26.

As the blade members 24, 25, the same shape as that of the blade members 14, 15 described in the first embodiment etc. can be used, and each of the blade members 24, 25 has substantially a rectangular parallelepiped shape in which the cross-sectional shape in a plane perpendicular to a movement direction is substantially a rectangle.

As distal ends 24a, 25a of the blade members 24, 25, the same shape as that of the distal ends 14a, 15a described in FIGS. 2 to 5 of the first embodiment or the distal ends 14a', 15a' described in FIG. 6 can be used. Also, in order to bring the distal ends 24a, 25a into contact with a side surface of a glass preform as much as possible at the time of being pressed by a pressing operation mechanism as described below, each of the distal ends 24a, 25a is preferably formed in a circular arc shape having curvature adapted for a maximum value assumed as a radius of the glass preform like the blade member described in the first embodiment etc.

Also, a material of each of the blade members 24, 25 is preferably carbon like the blade member of the first embodiment etc.

The storage part 23 is a disk-shaped member, and is stored and fixed to a housing 27. And, FIG. 9 illustrates a situation in which the storage part 23 is viewed from a cross section of A-A in FIG. 7. As shown in FIG. 9, the storage part 23 includes plural guide holes 23a, 23b for sliding the plural blade members 24, 25 on the circumference of the storage part 23 in two steps alternately. The guide holes 23a, 23b are formed radially with respect to the central axis of the storage part 23, and the blade members 24, 25 are also installed movably in a radial and linear direction like the blade member of the first embodiment etc. In addition, an inside diameter of the storage part 23 or a length of each of the blade members 24, 25 in the movement direction is determined so as to fill a gap formed between a drawing furnace and the glass preform. Also, a width of each of the blade members 24, 25 or the number of blade members 24, 25 is selected according to, for example, an outside diameter of the glass preform used.

As shown in FIG. 7, the cylindrical slit spring 26 is formed in the periphery of the blade members 24, 25, and functions as a pressing operation mechanism for pressing the blade members 24, 25 in a direction of the center of the storage part 23 (an urging mechanism for urging a force in the direction of the center).

The cylindrical slit spring 26 is desirably formed of a heat-resistant material, for example, any of carbon, ceramics, a carbon-ceramic composite material and a metal material, and preferably has resistance to heat of 200° C. or more.

The cylindrical slit spring 26 of the present example is obtained by, for example, forming slits in the cylindrical heat-resistant material alternately from upward and downward directions. FIG. 10 illustrates a part of the cylindrical slit spring 26. In the cylindrical slit spring 26, slits 26*a* from the upward direction and slits 26*b* from the downward direction are formed alternately. Particularly, when carbon is used as the material of the cylindrical slit spring 26, processing for forming the slits 26*a*, 26*b* is facilitated relatively.

The cylindrical slit spring 26 can be extended and contracted in a circumferential direction by such slits 26*a*, 26*b*, and produces a force (contraction force) of contraction in a cylindrical radial direction of the cylindrical slit spring 26 by such a circumferential elastic force. The cylindrical slit spring 26 is formed so as to press the blade members 24, 25 on the side surface of the glass preform by this contraction force in the cylindrical radial direction.

An installation form of the cylindrical slit spring 26 is shown in the sectional view of FIG. 7 and the top view of FIG. 8. In the case of an example of FIGS. 7 and 8, the seal structure 20 brings the distal ends of the plural blade members 24, 25 into contact with the side surface of the glass preform 5 by individually pressing the plural blade members 24, 25 in a radial direction of the drawing furnace (more accurately, a radial direction of the storage part 23) by the contraction force of the cylindrical slit spring 26 in the cylindrical radial direction. And, by adjusting a slit width or a thickness of the cylindrical slit spring 26, this pressing force can be adjusted to a weak force to the extent to which a surface of the glass preform is not damaged or the blade member is not broken or damaged, and to a strong force to the extent to which the blade member can be moved smoothly.

Accordingly, as shown in FIG. 7, even when the glass preform 5 is downwardly moved as shown by an arrow by progress of drawing and an outside diameter of the glass preform 5 increases, for example, from $\phi_1$ to $\phi_2$ ($>\phi_1$), the cylindrical slit spring 26 can be extended to the outside as shown by arrows with the blade members 24, 25 fastened uniformly in the circumferential direction and when the outside diameter of the glass preform 5 decreases in reverse, the cylindrical slit spring 26 can be contracted. Hence, this cylindrical slit spring 26 can automatically absorb variations in diameter of the glass preform 5.

Further, since the seal structure 20 of the present example has a structure of independently sliding each of the plural blade members 24, 25, the seal structure 20 can cope with the case where the diameter of the glass preform 5 is not constant on the same cross section, that is, the glass preform 5 has a non-circular cross section.

Also, as shown in FIG. 7, the housing 27 of the seal structure 20 is provided with a gas inlet 27*a* to which an inert gas etc. are supplied by a supply mechanism (not shown) and further, the storage part 23 is provided with a gas vent 23*c*. When carbon is used as the member such as the blade members 24, 25 or the cylindrical slit spring 26, the inert gas etc. spread over the inside of the housing 27 and the blade members 24, 25 by the gas inlet 27*a* and the gas vent 23*c*, and oxidation degradation of the members can be prevented. In addition, the inert gas etc. herein may be the same as gas supplied to the inside of the furnace or may be a different kind of gas.

Also in the seal structure 20 of the present example as described above, like the first embodiment etc., even when variations in diameter of the glass preform 5 of FIG. 1 are great, the gap S can well be closed and gas leakage inside the furnace can be prevented and also, the inflow of the outside air can be prevented. Also, since the seal structure of the present example uses the cylindrical slit spring 26 with a simple structure extended and contracted in the radial direction as the pressing operation mechanism, equipment can be simplified and maintenance is also facilitated.

Third Embodiment

Figure 11:
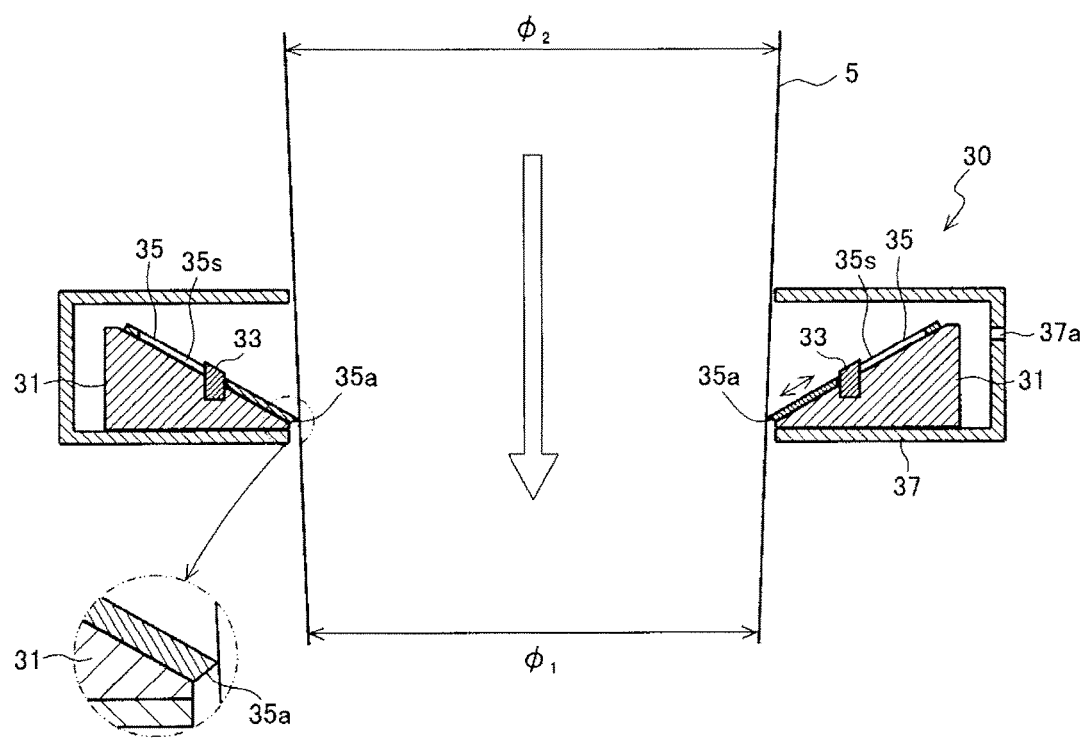
FIG. 11 is a sectional view showing an outline of a third embodiment of a seal structure according to the invention.
Figure 12A:
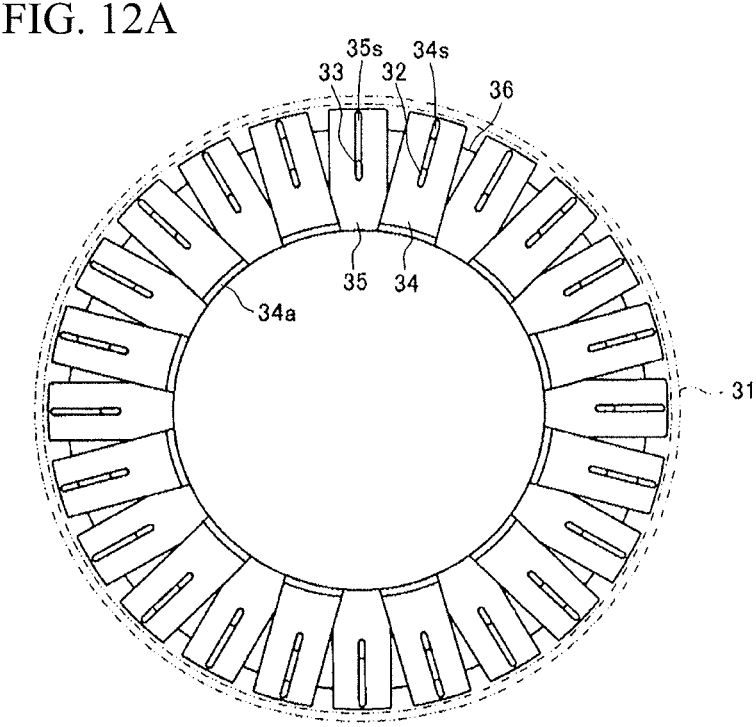
FIG. 12A and FIG. 12B are diagrams describing opened and closed states of blade members in the seal structure of FIG. 11.
Figure 12B:
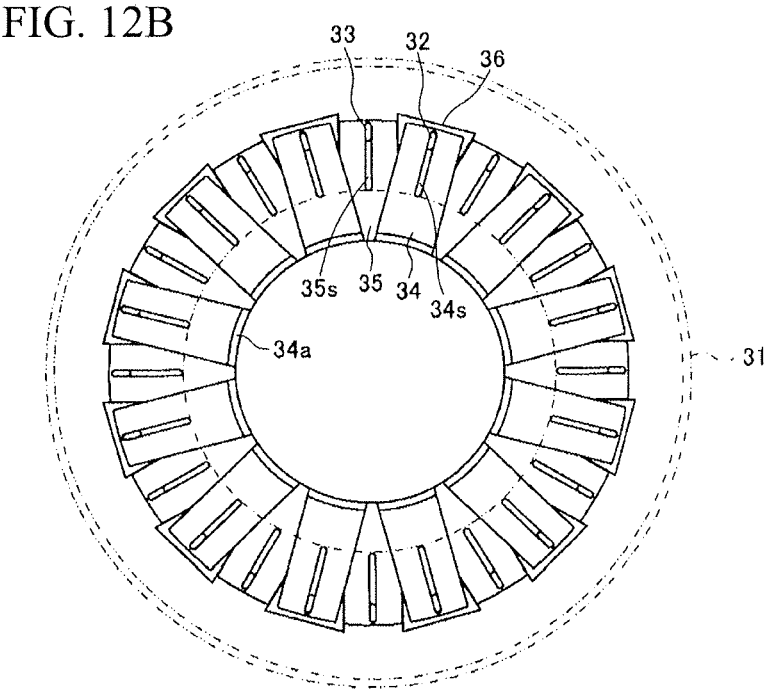

Next, a seal structure 30 according to a third embodiment of a seal mechanism will be described with reference to FIGS. 11, 12A and 12B. FIG. 11 is a sectional view showing an outline of the seal structure 30, and FIG. 12A and FIG. 12B shows a situation of the case where blade members in the seal structure of FIG. 11 are in opened and closed states, and FIG. 12A is a diagram showing a situation in which the blade members are in the opened state, and FIG. 12B is a diagram showing a situation in which the blade members are in the closed state (the most closed state).

The seal structure 30 includes plural blade members 34, 35 with heat resistance, an inclination table 31 for supporting the blade members 34, 35, and a support mechanism having a slide mechanism.

Also, the plural blade members 34, 35 and the support mechanism are placed and stored inside a housing 37 shown in FIG. 11. In addition, FIG. 11 illustrates a configuration in which upper and lower surfaces and a side surface of the inclination table 31 are covered with the housing 37, but the configuration is not limited to this and, for example, it may be constructed so that a bottom wall of the housing 37 is eliminated and the inclination table 31 is directly placed on the upper end of a drawing furnace. Also, a configuration without the housing 37 may be adopted.

The inclination table 31 for supporting the plural blade members 34, 35 is a table which is inclined downwardly toward the central axis of an upper end opening 2*a* of FIG. 1 and has an insertion hole for inserting a glass preform 5 in the center. That is, the inclination table 31 is a disk-shaped member having a shape in which a right triangle whose base is a side parallel to the upper end of the drawing furnace and whose height is in the direction of the central axis of the upper end opening is rotated around the upper end opening using the central axis of the upper end opening as the center of rotation as shown in FIG. 11. In addition, the right triangle may be other shapes, for example, a trapezoid actually as shown in FIG. 11, as long as the right triangle has the inclined portion. Also, a diameter of the insertion hole of the glass preform 5 in the inclination table 31 is desirably equal to a diameter of the upper end opening, but the diameters may be somewhat long or short.

The above mechanism corresponds to the pressing operation mechanisms in the first and second embodiments described above, and is a mechanism for individually sliding the plural blade members 34, 35 in a radial direction of the drawing furnace along inclination of the inclination table 31 under own weight of each of the plural blade members 34, 35. And, by this slide mechanism, the distal ends of the plural blade members 34, 35 can be brought into contact with a side surface of the glass preform 5 under its own weight.

Next, the above slide mechanism will be described by giving a concrete example. As shown in FIGS. 12A and 12B, the circumference of the inclination table 31 is provided with plural projections 32 for linearly sliding the plural blade members 34 in a radial direction with respect to the central axis of the inclination table 31. Also, as shown in FIGS. 11 and 12, the circumference of the inclination table 31 is provided with plural projections 33 for linearly sliding the plural blade members 35 in the radial direction with respect to the central axis of the inclination table 31.

Use of these plural projections 32, 33 is one example of the slide mechanism described above, and the projections 32, 33 are formed alternately along the circumferential direction of the inclination table 31. In addition, an auxiliary member 36 of FIG. 12 is formed on the inclination table 31 so as to have a slide surface of the blade member 34, and the blade member 34 can be slid while a part of the lower surface of the blade member 34 abuts on an upper surface of the blade member 35 at a height of the upper surface side of the blade member 35.

A horizontal cross section of each of the projections 32, 33 is substantially a rectangle, and guide slits (slide holes) 34s, 35s having a width adapted for a short side of the rectangle are respectively formed in the blade members 34, 35. Since the plural projections 32, 33 with such shapes are radially formed on the inclination table 31, the blade members 34, 35 can also be slid radially as shown in an example of shifting from a state of FIG. 12A to a state of FIG. 12B. In addition, it may be constructed so that the sides of the blade members 34, 35 are provided with the projections 32, 33 and the inclined surface side of the inclination table 31 is provided with slide grooves for guiding the blade members 34, 35. Also, the example of forming one projection on one blade member is given, but it may be constructed so as to be slid by forming two guide pins.

As the blade members 34, 35, the same shape as that of described in the first and second embodiments etc. can be used, and a cross-sectional shape in a plane perpendicular to a movement direction is formed in substantially a rectangle or a shape having a circular arc in a width direction. In addition, a length (slide distance) of each of the blade members 34, 35 in the movement direction with respect to the inclination table 31 is determined by, for example, a length of each of the guide slits 34s, 35s, and can be determined so as to close a gap formed between the drawing furnace and the glass preform.

Also, as distal ends 34a, 35a of the blade members 34, 35, the same shape as that of the distal ends 14a, 15a described in FIGS. 2 to 5 of the first embodiment or the distal ends 14a', 15a' described in FIG. 6 can be used.

In order to bring the distal ends 34a, 35a of the blade members 34, 35 into contact with the side surface of the glass preform 5 as much as possible at the time of being downwardly moved along the inclination under its own weight, each of the distal ends 34a, 35a is preferably formed in a circular arc shape having curvature adapted for a maximum value assumed as a radius of the glass preform 5 like the blade member described in the first and second embodiments etc.

Referring to an example of FIGS. 11 and 12, the blade member 35 is slid on the projection 33 while abutting on an inclined surface of the inclination table 31. On the other hand, the blade member 34 is slid on the projection 32 while abutting on an upper surface of the auxiliary member 36.

The blade members 34, 35 are arranged so that a gap formed between the adjacent blade members 34 is filled with the blade member 35 and a gap formed between the adjacent blade members 35 is filled with the blade member 34, that is, so that the gap between the adjacent blade members 34 does not overlap with the gap between the adjacent blade members 35.

A material of each of the blade members 34, 35 is preferably carbon like the blade member of the first and second embodiments. In addition, when the carbon is used as each of the blade members 34, 35, in order to prevent oxidation degradation, it is desirable to hold the periphery of the blade members 34, 35 in an atmosphere of an inert gas etc. by, for example, spraying the blade members 34, 35 with the inert gas etc. In addition, the inclination table 31 and other components with high heat resistance are preferably adopted, and preferably have resistance to heat of about 200° C. or more like the blade members 34, 35.

As described above, the seal structure 30 brings the distal ends of the plural blade members 34, 35 into contact with the side surface of the glass preform 5 by individually sliding the blade members 34, 35 in the radial direction of the drawing furnace along the inclination of the inclination table 31 under own weight of each of the blade members 34, 35. And, an angle of an inclination part of the inclination table 31 or weights of the blade members 34, 35 can be designed to adjust a pressing force under this own weight to a weak force to the extent to which a surface of the glass preform is not damaged or the blade member is not broken or damaged, and to a strong force to the extent to which the blade member can be moved smoothly. As the angle of the inclination part, about 20° to 45° with respect to a horizontal direction are assumed, but it can be applied by adjusting the weights even in the range of 5° to 85°. For example, the angle of the inclination part is desirably set small (for example, about 5° to 45°) in order to retract the blade members 34, 35 in an outer circumferential direction without breaking the blade members 34, 35 at the time of inserting the glass preform 5.

Accordingly, in the example shown in FIG. 11, even when the glass preform 5 is downwardly moved as shown by an arrow during progress of optical fiber drawing and an outside diameter of the glass preform 5 increases, for example, from $\phi_1$ to $\phi_2$ ($>\phi_1$), the blade members 34, 35 can be slid outwardly upwardly from the state shown in FIG. 12B to the state shown in FIG. 12A while pressing the side surface of the glass preform 5 by a constant force. When the outside diameter of the glass preform 5 decreases in reverse, the blade members 34, 35 can be slid inwardly downwardly while pressing the side surface of the glass preform 5 by the constant force.

As a result, the seal structure 30 can automatically absorb variations in diameter of the glass preform 5. Also, since the seal structure 30 has a structure of independently sliding each of the plural blade members 34, 35, the seal structure 30 can cope with the case where the diameter of the glass preform 5 is not constant on the same cross section, that is, the glass preform 5 has a non-circular cross section.

As shown in FIG. 11, the housing 37 of the seal structure 30 is provided with a gas inlet 37a to which an inert gas etc. are supplied by a gas supply mechanism (not shown). When carbon is used as the member such as the blade members 34, 35 or the inclination table 31, the inert gas etc. spread over the inside of the housing 37, the blade members 34, 35 and the inclination table 31 by the gas inlet 37a, and oxidation degradation of the members can be prevented. In addition, the inert gas etc. herein may be the same as gas supplied to the inside of the furnace or may be a different kind of gas. Also, the inclination table 31 may be provided with a gas vent (not shown) to introduce the inert gas etc. from the back side of the blade members 34, 35.

Also in the seal structure 30 of the present example as described above, like the first and second embodiments etc., even when variations in diameter of the glass preform are great, the gap S can well be closed and gas leakage inside the furnace can be prevented and also, the inflow of the outside air can be prevented.

Also, since the seal structure of the present example has the seal mechanism with a simple structure in which the blade members 34, 35 arranged along inclination are brought into contact with the side surface of the glass preform using own weight of each of the blade members 34, 35, equipment can be simplified and maintenance is also facilitated.

Fourth Embodiment

Figure 13:
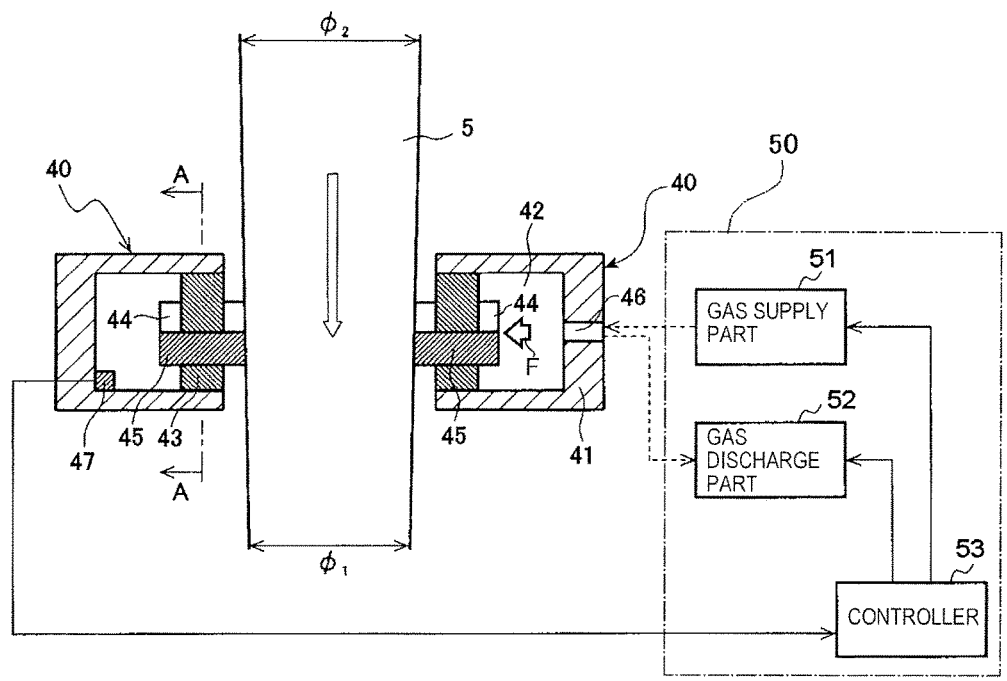
FIG. 13 is a sectional view showing an outline of a fourth embodiment of a seal structure according to the invention.

As shown in FIG. 13, a seal structure 40 of a fourth embodiment includes plural blade members 44, 45 with heat resistance, an annular housing 41 for receiving the blade members 44, 45, and a pressing operation mechanism 50 having operation of pushing or pulling the blade members 44, 45 inwardly and outwardly using a pressure difference.

The housing 41 is provided with a suction and discharge port 46 for connecting a gas pool 42 of the inside of the housing 41 to a gas supply part 51 or a gas discharge part 52 described below, and is constructed so that an inert gas etc. from the gas supply part 51 can be supplied to the gas pool 42. When carbon is used as members constructing the seal structure 40 such as the blade members 44, 45 as described below, this inert gas etc. spread over the gas pool 42, the blade members 44, 45, etc., and oxidation degradation of each of the members can be prevented.

As the inert gas etc. supplied to the gas pool 42, for example, the same gas as gas of the inside of a furnace supplied to the periphery of a heater or the inside of a furnace core tube is used. As a result, even when the inert gas etc. of the gas pool 42 leak from the periphery of the blade members 44, 45 toward a drawing furnace, the gas of the inside of the furnace is replenished with the inert gas etc. supplied to this gas pool 42, with the result that a problem does not arise. In addition, the gas pool 42 corresponds to internal space of the housing.

A storage part 43 forming a part of demarcation of the gas pool 42 is received inside the housing 41.

Figure 14:
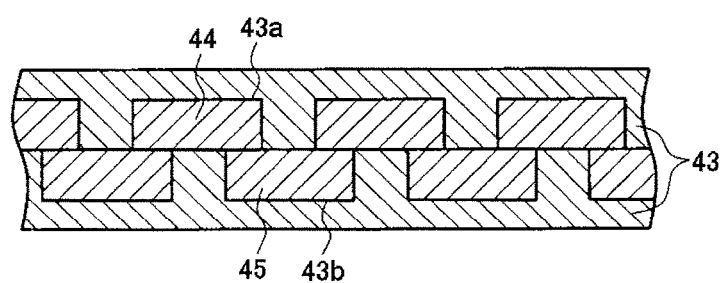
FIG. 14 is a diagram showing a cross section of A-A of the seal structure of FIG. 13.

The storage part 43 is a disk-shaped member, and includes plural guide holes 43a, 43b for sliding the blade members 44, 45 on the circumference of the storage part 43, for example, in two steps alternately as shown in FIG. 14. The guide holes 43a, 43b are formed radially with respect to the central axis of the storage part 43, and the blade members 44, 45 are also installed movably in a radial and linear direction. In addition, the blade members 44, 45 can be formed directly in the housing 41 rather than being formed in the storage part 43.

As the blade members 44, 45, the same shape as that of the blade members 14, 15 described in the first embodiment etc. can be used, and each of the blade members 44, 45 has substantially a rectangular parallelepiped shape in which the cross-sectional shape in a plane perpendicular to a movement direction is substantially a rectangle. In addition, each of the guide holes 43a, 43b described above is formed in a hole with a shape adapted for the cross-sectional shape of each of the blade members 44, 45.

Also, a thickness and a width (a length parallel to a tangential direction of the storage part 43) are set so that the cross-sectional shape of the blade members 44, 45 has a cross-sectional area of 0.1 cm$^2$ or more in a place in which the gas operates, and are set in, for example, a thickness of about 0.5 cm and a width of about 1.5 cm.

The distal end of each of the blade members 44, 45 is brought into contact with a side surface of a glass preform at the time of being pressed by the pressing operation mechanism 50 as described below. Consequently, the distal end of each of the blade members 44, 45 is preferably formed in a circular arc shape having curvature adapted for a maximum value (a maximum diameter of the glass preform used) assumed as a radius of the glass preform in order to minimize a gap with the glass preform at the time of contact.

Also, a material of each of the blade members 44, 45 is preferably carbon like the blade member of the first embodiment etc.

In addition, an inside diameter of the storage part 43 or a length of each of the blade members 44, 45 in the movement direction can be determined so as to fill a gap formed between the drawing furnace and the glass preform like the blade member of the first embodiment etc.

Also, a width of each of the blade members 44, 45 or the number of blade members 44, 45 can properly be selected according to, for example, a bend amount, an outside diameter variation amount or an outside diameter of the glass preform used in a manner similar to the above.

As described above, the storage part 43 includes plural guide holes 43a, 43b on the circumference of the storage part 43 in two steps alternately, and the blade members 44, 45 are inserted into these guide holes in a linearly movable state. Consequently, the plural blade members 44 are equally spaced on the circumference of the storage part 43 and also, the plural blade members 45 are equally spaced on the circumference of the storage part 43. And, a distance is prevented from being vertically formed between the blade members 44 and the blade members 45.

Further, the blade members 44, 45 are constructed so that a gap formed between the adjacent blade members 44 is filled with the blade member 45 and a gap formed between the adjacent blade members 45 is filled with the blade member 44. That is, the blade members 44, 45 are arranged so that the gap between the adjacent blade members 44 does not overlap with the gap between the adjacent blade members 45. Accordingly, the gap S of FIG. 1 can be closed to be sealed so that the inert gas etc. are resistant to leakage.

Thus, in the invention, the plural blade members 44, 45 are preferably formed so as to overlap alternately in a two-layer structure. Such a structure closes the gap formed in the upper end opening of the drawing furnace by bringing the distal ends of the blade members 44, 45 into contact with the glass preform. And, each of the plural blade members 44, 45 is installed slidably independently in a horizontal direction toward the center of the glass preform.

Here, the pressing operation mechanism 50 individually presses the plural blade members 44, 45 in a radial direction (more accurately, a radial direction of the storage part 43) of the drawing furnace so as to bring the distal ends of the blade members 44, 45 into contact with the side surface of the glass preform with the blade members 44, 45 respectively inserted into the plural guide holes 43a, 43b. This pressing force shall be weak to the extent to which a surface of the glass preform is not damaged or the blade member is not broken or damaged, and shall be strong to the extent to which the blade member can be moved smoothly.

As shown in FIG. 13, the gas supply part 51 and the gas discharge part 52 are electrically connected to a controller 53. The gas pool 42 is provided with, for example, a furnace internal pressure detector 47, and an internal pressure of the gas pool 42 is detected by the furnace internal pressure detector 47 and is outputted to the controller 53.

When the controller 53 outputs a driving signal to the gas supply part 51 based on, for example, a detection result of the furnace internal pressure detector 47 or instructions from a worker, the inert gas etc. are supplied to the gas pool 42 through the suction and discharge port 46. The gas pool 42 is pressurized and changes to an atmosphere (pressure P1) of a positive pressure, and this pressure P1 operates on the blade members 44, 45 of the inside of the gas pool 42.

On the other hand, when a pressure P2 (<P1) of the inside of the drawing furnace operates on the blade members 44, 45 of the outside of the gas pool 42 and a cross-sectional area of the blade members 44, 45 is A, the product (ΔP×A) of a differential pressure ΔP between the pressure P1 and the pressure P2 and the cross-sectional area A operates as a force F on the blade members 44, 45. Accordingly, the blade members 44, 45 can be projected to the extent to which the distal ends of the blade members 44 make contact mutually or the distal ends of the blade members 45 make contact mutually, and make contact with the side surface of the glass preform 5 by this force F.

In addition, when the differential pressure ΔP is 0.01 MPa in the case of assuming the blade members having a cross-sectional area of 1 cm$^2$ in the place in which the gas operates, the blade members make contact with the glass preform by a force of about 1 N since 1 Pa is about 0.0001 N/cm$^2$.

On the other hand, when the controller 53 of FIG. 13 outputs a driving signal to the gas discharge part 52, the inert gas etc. of the inside of the gas pool 42 are sucked through the suction and discharge port 46. The gas pool 42 is depressurized and changes to, for example, an atmosphere (pressure P1) of a negative pressure, and this pressure P1 operates on the blade members 44, 45 of the inside of the gas pool 42.

On the other hand, when a pressure P2 (>P1) of the inside of the drawing furnace operates on the blade members 44, 45 of the outside of the gas pool 42, the product (Δp×A) of a differential pressure Δp between the pressure P1 and the pressure P2 and the cross-sectional area A operates as the force F on the blade members 44, 45. Accordingly, the blade members 44, 45 break contact with the side surface of the glass preform 5, and can be retracted to the extent to which the blade members 44, 45 are substantially stored in the storage part 43 as shown in FIG. 4B.

Consequently, when the glass preform is taken in and out at high speed with respect to the drawing furnace, for example, when the glass preform is set in the drawing furnace or is taken out of the drawing furnace, the blade members can be previously retracted, with the result that the blade members can be prevented from being broken or damaged.

In addition, when the gas pool 42 is depressurized to the negative pressure as described above, the blade members 44, 45 can speedily be retracted in the storage part 43, and even when the gas pool 42 is depressurized to about atmospheric pressure, a pressing force on the glass preform 5 becomes released, with the result that a load on the blade member can be reduced.

Also, by horizontally sliding each of the blade members 44, 45, variations in diameter of the glass preform 5 can be absorbed, and the flow of the outside air into the furnace can be reduced.

Concretely, as shown in FIG. 13, even when the glass preform 5 is downwardly moved as shown by an arrow by progress of drawing and an outside diameter of the glass preform 5 increases, for example, from $\phi_1$ to $\phi_2$ (>$\phi_1$), the blade members 44, 45 can be moved outwardly with the glass preform 5 pressed uniformly. When the outside diameter of the glass preform 5 decreases in reverse, the blade members 44, 45 can be moved inwardly with the glass preform 5 pressed uniformly.

In addition, by an increase or decrease in the outside diameter of the glass preform 5, the gas pool 42 may be pressurized or depressurized to adjust a pressing force on the glass preform 5.

Further, since a structure of independently sliding each of the plural blade members 44, 45 is had, the structure can cope with the case where the diameter of the glass preform 5 is not constant on the same cross section, that is, the glass preform 5 has a non-circular cross section.

Incidentally, the storage part 43 may include a stopper for preventing the blade members 44, 45 from coming out.

Figure 15A:
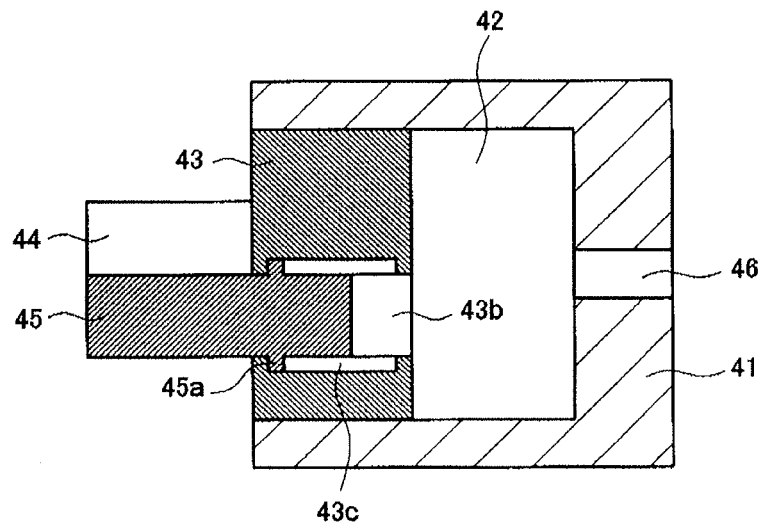
FIG. 15A and FIG. 15B are section views of one example showing a main part of the seal structure of the fourth embodiment.
Figure 15B:
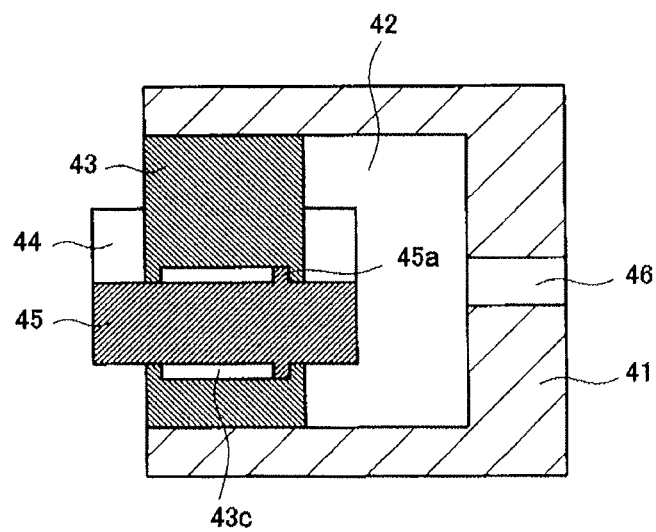

As shown in FIG. 15A and FIG. 15B, an upper surface and a lower surface of the blade member 45 are respectively provided with projections 45a, and the guide hole 43b corresponding to this blade member 45 is provided with grooves 43c for respectively receiving the projections 45a. The groove 43c does not extend through the storage part 43 and is configured engageably with the front end or the back end of the projection 45a. In addition, the blade member 44 is not illustrated but like the blade member 45, projections are formed and the corresponding storage part 43 is also provided with grooves.

In addition, the configuration of FIG. 15A and FIG. 15B are views of one example of the case of forming the stopper, and only the upper surface side may have the projection and the groove and also, the guide hole side may have the projection and the blade member side may have the groove.

Since the storage part has a stopper function and limits a stroke of the blade member in this manner, the blade member does not come out inside the furnace even when the blade member is moved toward the center of the upper end opening in the absence of the glass preform.

In addition, the distal end of the blade member may be completely retracted into the storage part. Also, the blade member may be movably configured to be moved away from the glass preform by gas supply to the gas pool and be moved near to the glass preform by gas discharge from the gas pool.

Figure 16:
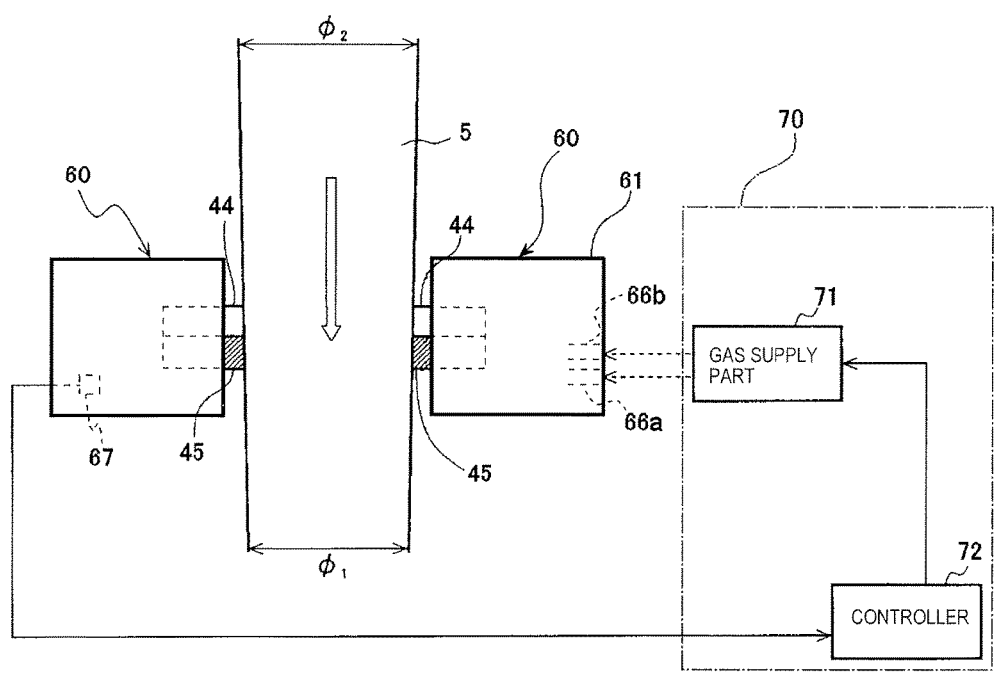
FIG. 16 is a sectional view showing an outline of a seal structure and a pressing operation mechanism of a modified example of the fourth embodiment.

Also, the fourth embodiment may include a seal structure 60 and a pressing operation mechanism 70 as shown in FIGS. 16 and 17 as a modified example of the seal structure 40 and the pressing operation mechanism 50 described above. A blade member 45 in the seal structure 60 has a partition part 45b for partitioning internal space of a housing 61 into an inward part and an outward part in a radial direction of a drawing furnace. Also, the housing 61 has plural gas passages 66a, 66b respectively communicated to the internal space partitioned by the partition part 45b. Accordingly, the pressing operation mechanism 70 has operation of moving the blade member 45 to any one of the inward part and the outward part in the radial direction of the drawing furnace by supplying gas to any one of the gas passages 66a, 66b.

Further, the seal structure 60 will be described concretely.

Figure 17A:
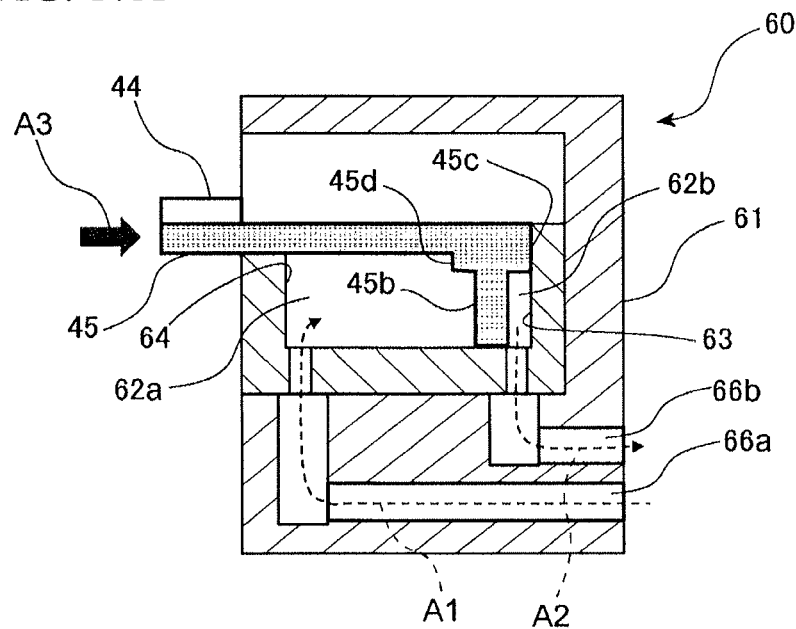
FIG. 17A and FIG. 17B are sectional views of one example of showing a main part of the seal structure and the pressing operation mechanism of FIG. 16.
Figure 17B:
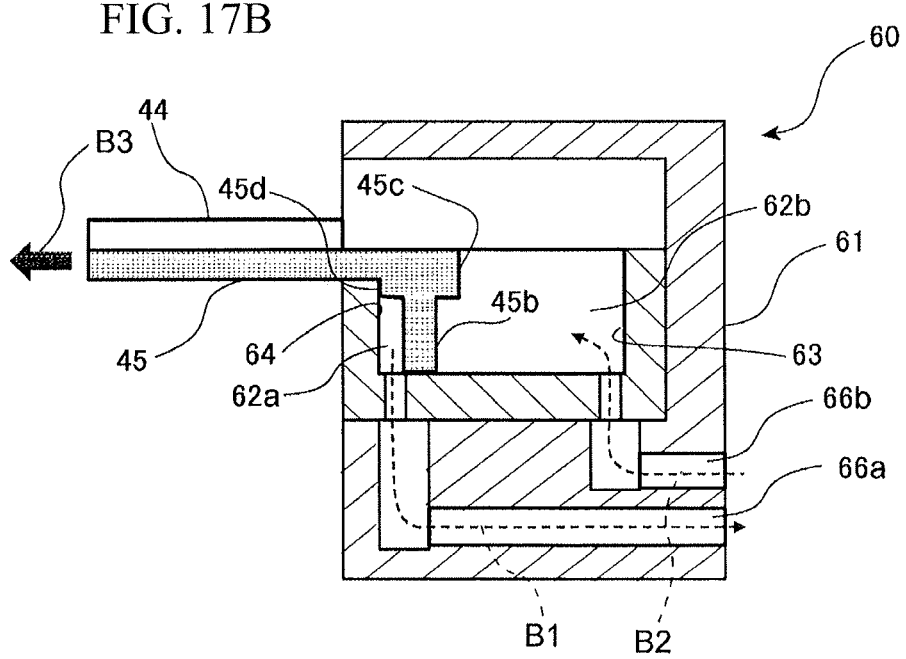
Figure 18A:
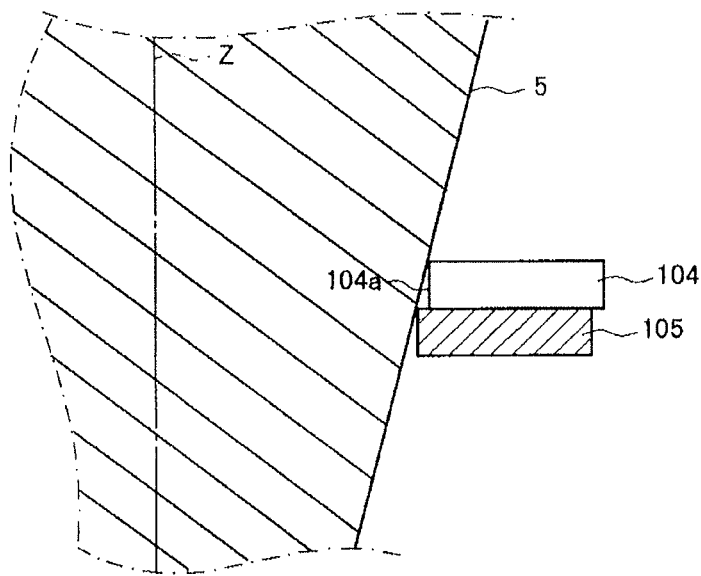
FIG. 18A and FIG. 18B are diagrams describing an action of blade members in a conventional seal structure.
Figure 18B:
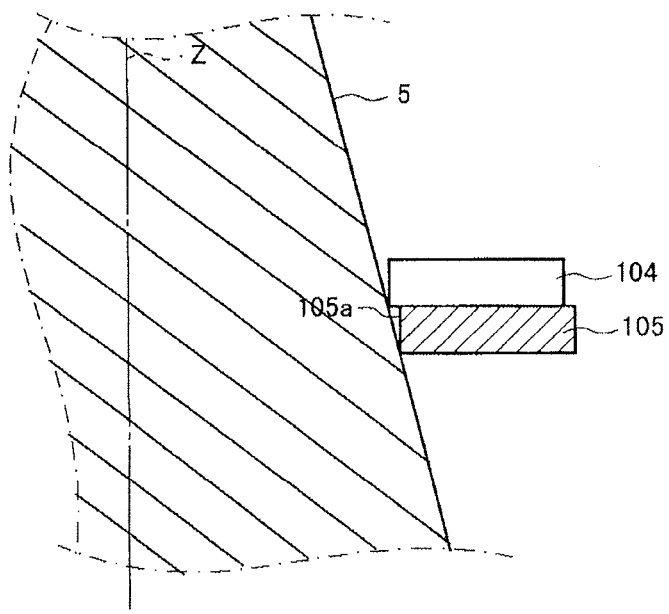

As shown in FIG. 17A and FIG. 17B, a lower surface of the blade member 45 is provided with the partition part 45b. This partition part 45b is formed so as to partition the internal space of the housing 61 into a gas pool inside part 62a and a gas pool outside part 62b along the inside and the outside in the radial direction of the drawing furnace.

And, the housing 61 is provided with the two gas passages 66a, 66b connected to a gas supply part 71. The gas passage 66a is communicated to the gas pool inside part 62a, and the gas passage 66b is communicated to the gas pool outside part 62b, and the pressing operation mechanism 70 is constructed so that any one of the two gas passages 66a, 66b is selected as a gas supply passage and an inert gas etc. can be supplied from the gas supply part 71 to the inside of the housing 61.

For example, when the controller 72 outputs a driving signal to the gas supply part 71 based on, for example, a detection result of a furnace internal pressure detector 67 or instructions from a worker, the inert gas etc. are supplied from the gas supply part 71 to any one of the gas passages 66*a*, 66*b*.

When the inert gas etc. are supplied from the gas supply part 71 to the gas passage 66*a*, the inert gas etc. are supplied to the gas pool inside part 62*a* of the inside of the partition part 45*b* in a direction shown by arrow A1 as shown in FIG. 17A. Then, the partition part 45*b* is pressed in a direction (direction of arrow A3) away from a glass preform 5 by pressurizing the gas pool inside part 62*a*. This operates so as to move the blade member 45 away from the glass preform 5. At this time, movement of the partition part 45*b* presses the inert gas etc. of the inside of the gas pool outside part 62*b*, and discharges the inert gas etc. to the outside of the housing 61 through the gas passage 66*b* in a direction shown by arrow A2.

On the other hand, when the inert gas etc. are supplied from the gas supply part 71 to the gas passage 66*b*, the inert gas etc. are supplied to the gas pool outside part 62*b* of the outside of the partition part 45*b* in a direction shown by arrow B2 as shown in FIG. 17B. Then, the partition part 45*b* is pressed in a direction (direction of arrow B3) near to the glass preform 5 by pressurizing the gas pool outside part 62*b*. This operates so as to move the blade member 45 near to the glass preform 5. At this time, movement of the partition part 45*b* presses the inert gas etc. of the inside of the gas pool inside part 62*a*, and discharges the inert gas etc. to the outside of the housing 61 through the gas passage 66*a* in a direction shown by arrow B1.

In addition, both sides of an upper part of the partition part 45*b* are respectively provided with a protrusion 45*c* and a protrusion 45*d*, and in the case of FIG. 17A, the partition part 45*b* does not close the gas passage 66*b* even when the protrusion 45*c* abuts on an inner sidewall 63 of the side of the gas pool outside part 62*b*. Also, in the case of FIG. 17B, the partition part 45*b* does not close the gas passage 66*a* even when the protrusion 45*d* abuts on an inner sidewall 64 of the side of the gas pool inside part 62*a*.

Accordingly, even in the case of changing from a state (state of FIG. 17A) in which the blade member 45 is moved to abutment on the inner sidewall 63 to a state in which the gas supply part 71 supplies the inert gas etc. to the gas passage 66*b*, the inert gas etc. can be supplied to the gas pool outside part 62*b*. Similarly, even in the case of changing from a state (state of FIG. 17B) in which the blade member 45 is moved to abutment on the inner sidewall 64 to a state in which the gas supply part 71 supplies the inert gas etc. to the gas passage 66*a*, the inert gas etc. can be supplied to the gas pool inside part 62*a*.

In addition, the blade member 44 is provided with a partition part etc. (not shown) similar to those of the blade member 45, and like the blade member 45, it can be operated so as to move the blade member 44 away from the glass preform 5, or move the blade member 44 near to the glass preform 5.

DESCRIPTION OF REFERENCE NUMERALS AND SIGNS

1 DRAWING FURNACE (OPTICAL FIBER DRAWING FURNACE)
2 FURNACE HOUSING
2*a* UPPER END OPENING
2*b* LOWER END OPENING
3 FURNACE CORE TUBE
4 HEATER
5 GLASS PREFORM (OPTICAL FIBER GLASS PREFORM)
5*a* LOWER END
5*b* OPTICAL FIBER
6 SUPPORT ROD
7 HEAT INSULATING MATERIAL
8 SEAL MECHANISM
9 LID BODY
9*a* THROUGH HOLE
9*b* SHOULDER PART
10,10',20,30,40,60 SEAL STRUCTURE
11 INSIDE CYLINDER
12 OUTSIDE CYLINDER
13,23 STORAGE PART
13*a*,13*b*,23*a*,23*b* GUIDE HOLE
14,15,24,25,34,35,104,105 BLADE MEMBER
14*a*,15*a*,14*a*',15*a*',24*a*,25*a*,34*a*,35*a* DISTAL END
16 ROD-SHAPED MEMBER
17 COIL SPRING MEMBER
18 FIXING MEMBER
23*c* GAS VENT
26 CYLINDRICAL SLIT SPRING
26*a*,26*b* SLIT
27,37 HOUSING
27*a*,37*a* GAS INLET
31 INCLINATION TABLE
32,33 PROJECTION
34*s*,35*s* GUIDE SLIT
36 AUXILIARY MEMBER
41,61 HOUSING
42 GAS POOL
43 STORAGE PART
43*a*,43*b* GUIDE HOLE
43*c* GROOVE
44,45 BLADE MEMBER
45*a* PROJECTION
45*b* PARTITION PART
45*c*,45*d* PROTRUSION
46 SUCTION AND DISCHARGE PORT
47,67 FURNACE INTERNAL PRESSURE DETECTOR
50,70 PRESSING OPERATION MECHANISM
51,71 GAS SUPPLY PART
52 GAS DISCHARGE PART
53,72 CONTROLLER
62*a* GAS POOL INSIDE PART
62*b* GAS POOL OUTSIDE PART
66*a*,66*b* GAS PASSAGE

The invention claimed is:

1. A seal structure of an optical fiber drawing furnace for sealing a gap between an upper end opening of the optical fiber drawing furnace and an optical fiber glass preform inserted from the upper end opening, comprising:
a plurality of blade members, a support mechanism for supporting the plurality of blade members, and a pressing operation mechanism for individually pressing the plurality of blade members in a radial direction of the optical fiber glass preform so as to bring distal ends of the plurality of blade members into contact with a side surface of the optical fiber glass preform, wherein a pressing force at the time of bringing the plurality of blade members into contact with the optical fiber glass preform is set at 0.1 to 10 N per blade member, wherein the plurality of blade members are arranged in at least two steps alternately in a vertical direction and adjacent blade members of the plurality of blade members are spaced apart on a horizontal plane, wherein, at a position in which upper and lower blade members of the plurality of blade members overlap, distal ends of the plurality of blade members brought into contact with the side surface of the optical fiber glass preform are formed in a shape of linear contact with the side surface of the optical fiber glass preform, and wherein contact is maintained between the distal ends of the plurality of blade members at the position in which the upper and lower blade members of the plurality of blade members overlap and the side surface of the optical fiber glass preform.

2. The seal structure of an optical fiber drawing furnace as claimed in claim 1, wherein the pressing force at the time of bringing the plurality of blade members into contact with the optical fiber glass preform is set at 0.1 to 1 N per blade member.

3. The seal structure of an optical fiber drawing furnace as in claim 1, wherein the distal end of the blade member is formed in a circular arc shape having curvature adapted for a maximum value assumed as a radius of the optical fiber glass preform.

4. The seal structure of an optical fiber drawing furnace as claimed in claim 1, wherein the distal end of the blade member of an upper step of at least the two steps is inclined linearly so that a lower portion of the distal end is nearer to a central axis of the upper end opening, and the distal end of the blade member of a lower step of at least the two steps is inclined linearly so that an upper portion of the distal end is nearer to the central axis of the upper end opening.

5. The seal structure of an optical fiber drawing furnace as claimed in claim 1, wherein the distal end of the blade member of an upper step of at least the two steps is inclined in a curved shape so that a lower portion of the distal end is nearer to a central axis of the upper end opening, and the distal end of the blade member of a lower step of at least the two steps is inclined in a curved shape so that an upper portion of the distal end is nearer to the central axis of the upper end opening.

6. The seal structure of an optical fiber drawing furnace as in claim 1, wherein the pressing operation mechanism includes the blade members formed so as to be brought into contact with the side surface of the optical fiber glass preform, and a housing for receiving the blade members, and each of the blade members has a partition part for partitioning internal space of the housing, and the housing has a plurality of gas passages respectively communicated to the internal space partitioned by the partition part, and the pressing operation mechanism is a mechanism for moving the blade members to any one of sides in a radial direction of the optical fiber drawing furnace by supplying gas to any one of the plurality of gas passages.

7. The seal structure of an optical fiber drawing furnace as in claim 1, wherein the pressing operation mechanism has a plurality of rod-shaped members in which one ends are respectively fixed to back ends of the plurality of blade members and the other ends are respectively held in a part of the support mechanism, and a plurality of coil spring members formed along the plurality of respective rod-shaped members, and individually brings the plurality of blade members into contact with the optical fiber glass preform by elastic forces of the plurality of coil spring members.

8. The seal structure of an optical fiber drawing furnace as in claim 1, wherein the pressing operation mechanism has a plurality of air cylinders in which one ends are respectively fixed to back ends of the plurality of blade members and the other ends are respectively fixed to a part of the support mechanism, the air cylinder whose length can be extended and contracted in a radial direction of a drawing furnace body, and individually brings the plurality of blade members into contact with the optical fiber glass preform by pressing forces of the plurality of air cylinders.

9. The seal structure of an optical fiber drawing furnace as in claim 1, wherein the pressing operation mechanism individually brings the plurality of blade members into contact with the optical fiber glass preform by a contraction force of a cylindrical slit spring in a cylindrical radial direction, the cylindrical slit spring in which slits are formed in a cylindrical heat-resistant material alternately from upward and downward directions.

10. The seal structure of an optical fiber drawing furnace as in claim 1, wherein the pressing operation mechanism is formed by an inclination table in which the support mechanism of the blade members is inclined downwardly toward the central axis of the upper end opening and an insertion hole for inserting the optical fiber glass preform is had in a center, and brings the distal ends of the plurality of blade members into contact with the side surface of the optical fiber glass preform by individually sliding the plurality of blade members along inclination of the inclination table under own weight of each of the plurality of blade members.

11. A method for drawing an optical fiber using one seal structure of an optical fiber drawing furnace as claimed in claim 1.

12. The seal structure of an optical fiber drawing furnace as in claim 1, wherein the pressing operation mechanism includes the blade members formed so as to be brought into contact with the side surface of the optical fiber glass preform, and a housing for receiving the blade members, and is a mechanism for moving the blade members in a radial direction of the optical fiber drawing furnace by gas supply to internal space of the housing and gas discharge from the internal space.

13. The seal structure of an optical fiber drawing furnace as claimed in claim 12, wherein a storage part for guiding and storing the blade member is included inside the housing, and the storage part or the blade member has a stopper for preventing the blade member from coming out.

14. The seal structure of an optical fiber drawing furnace as in claim 12, wherein the gas supplied to the internal space of the housing is the same as gas of the inside of the optical fiber drawing furnace.

15. The seal structure of an optical fiber drawing furnace as in claim 12, wherein in the blade member, a cross-sectional area in a plane perpendicular to the radial direction of the optical fiber drawing furnace is 0.1 cm$^2$ or more in a place in which the gas operates.

16. A seal structure of an optical fiber drawing furnace for sealing a gap between an upper end opening of the optical fiber drawing furnace and an optical fiber glass preform inserted from the upper end opening, comprising:

a plurality of blade members arranged in at least two steps alternately in a vertical direction, a support mechanism for supporting the plurality of blade members, and a pressing operation mechanism for individually pressing the plurality of blade members in a radial direction of the optical fiber glass preform so as to bring distal ends of the plurality of blade members into contact with a side surface of the optical fiber glass preform, wherein when the total number of blade members in the at least two steps is N and a width of the blade member is L and a maximum diameter of the optical fiber glass preform is Dmax and a minimum diameter of the optical fiber glass preform is Dmin, $2\pi \times Dmin > L \times N > \pi \times Dmax$ is satisfied, wherein the plurality of blade members are arranged in at least the two steps alternately in the vertical direction and adjacent blade members of the plurality of blade members are spaced apart on a horizontal plane, wherein, at a position in which upper and lower blade members of the plurality of blade members overlap, distal ends of the plurality of blade members brought into contact with the side surface of the optical fiber glass preform are formed in a shape of linear contact with the side surface of the optical fiber glass preform, and wherein contact is maintained between the distal ends of the plurality of blade members at the position in which the upper and lower blade members of the plurality of blade members overlap and the side surface of the optical fiber glass preform.

17. The seal structure of an optical fiber drawing furnace as claimed in claim 16, wherein the number N of blade members is five or more per step.

18. The seal structure of an optical fiber drawing furnace as in claim 16, wherein the width L of the blade member is between 5 mm and 50 mm (both inclusive).

* * * * *